(12) United States Patent
Fontaine

(10) Patent No.: US 10,499,189 B2
(45) Date of Patent: Dec. 3, 2019

(54) COMMUNICATION OF DATA RELATING TO ENDPOINT DEVICES

(71) Applicant: Cisco Technology, Inc., San Jose, CA (US)

(72) Inventor: Lucas Fontaine, New York, NY (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/841,325

(22) Filed: Dec. 14, 2017

(65) Prior Publication Data

US 2019/0191274 A1    Jun. 20, 2019

(51) Int. Cl.

| | |
|---|---|
| *G08C 17/02* | (2006.01) |
| *H04W 4/02* | (2018.01) |
| *H04W 4/70* | (2018.01) |
| *H04L 29/08* | (2006.01) |
| *H04W 4/029* | (2018.01) |
| *G05B 15/02* | (2006.01) |

(52) U.S. Cl.
CPC ............ *H04W 4/023* (2013.01); *H04L 67/18* (2013.01); *H04L 67/2833* (2013.01); *H04W 4/70* (2018.02); *G05B 15/02* (2013.01); *H04L 67/12* (2013.01); *H04W 4/029* (2018.02)

(58) Field of Classification Search
CPC ........... H04W 4/23; H04W 4/70; G08C 17/02
See application file for complete search history.

(56) References Cited

U.S. PATENT DOCUMENTS

| | | |
|---|---|---|
| 9,154,900 B1 | 10/2015 | Addepalli et al. |
| 9,172,657 B2 | 10/2015 | Catrein et al. |
| 9,210,028 B1 | 12/2015 | Pinson |
| 2015/0264134 A1 * | 9/2015 | Dong et al. |
| 2016/0360340 A1 * | 12/2016 | Bhalia ................. H04L 67/16 |
| 2017/0006455 A1 | 1/2017 | Cho |
| 2017/0124193 A1 | 5/2017 | Li et al. |
| 2017/0208139 A1 | 7/2017 | Li et al. |
| 2017/0223479 A1 | 8/2017 | Ly et al. |
| 2018/0063672 A1 * | 3/2018 | Krebs ................. H04W 4/70 |
| 2018/0174434 A1 * | 6/2018 | Dyer ................. G08C 17/02 |

FOREIGN PATENT DOCUMENTS

WO    2017030943    2/2017

OTHER PUBLICATIONS

3GPP.org; 3GPP The Mobile Broadband Standard W-CDMA, (750009); [viewed Aug. 6, 2017].

(Continued)

*Primary Examiner* — Myron Wyche

(57) ABSTRACT

In one embodiment a method performed by a first device, comprising intercepting a first communication that is destined for a second device or that is originating from the second device but is not destined for the first device, the first communication requesting data relating to a third device or indicative of data determined by and relating to the third device, subsequent to the intercepting, generating a second communication destined for the second device, wherein the second communication is indicative of data relating to the third device that was determined by at least one of the first device or one or more fourth devices, and sending the second communication.

20 Claims, 12 Drawing Sheets

(56) References Cited

OTHER PUBLICATIONS

Cisco; Cisco Devnet—Step-By-Step-Tutorial [Viewed Dec. 2017].
Cisco Meraki; Location Analytics API [Viewed Dec. 2017].
Iyer, Rajiv; Cisco Mobility Services APIS Go Restful (Oct. 25, 2013).
Martigne, Patricia; Interworking With Cellular IOT (3GPP); Nov. 17, 2016.
OneM2M; Functional Architecture—Document No. TS-0001-V2.10.0 (Aug. 30, 2016).
OneM2M; Base Ontology—Technical Specification—Document No. TS-0012-V3.5.0 (Nov. 17, 2017).
oneM2M.org; Ontologies Used for ONEM2M (2017).
oneM2M.org; Requirements—Technical Specification—Document No. TS-0002-V2.7.1 (Aug. 30, 2016).
oneM2M.org; Application Developer Guide— Technical Report—Document No. TR-0025 V2.0.1 (Jun. 26, 2017).
International Search Report and Written Opinion in counterpart International Application No. PCT/US2018/064203, dated Feb. 21, 2019, 12 pages.

\* cited by examiner

COMMUNICATION OF DATA RELATING TO ENDPOINT DEVICES

TECHNICAL FIELD

The present disclosure generally relates to a network such as an Internet of Things (IoT) network.

BACKGROUND

An IoT network may include as "things", devices traditionally thought of as being in a network such as smartphone(s), laptop(s), personal computer(s), server(s), storage device(s), drive(s), etc., and/or other devices not traditionally thought of as being in a network such as light(s); appliance(s); vehicle(s); trash can(s); heating, ventilating, and air-conditioning (HVAC); window(s), window shade(s) and blind(s); door(s); lock(s); sensor(s); actuator(s); robot(s); camera(s); etc. An IoT network may include a private network and/or a publicly accessible network.

The oneM2M model used in the oneM2M (machine to machine) standard is a layered model supporting end to end machine to machine services. Such a model may be used for an IoT network. In accordance with the oneM2M release 2 specification, the layered model includes three layers: an application layer, a common services layer, and an underlying network services layer. An application entity (AE) is an entity in the application layer that implements an M2M application service logic. Each application service logic may be resident in a number of M2M nodes and/or more than once on a single M2M node. Each execution instance of an application service logic is termed an application entity. A common services entity (CSE) represents an instantiation of a set of common service functions of the M2M environments. Such service functions are exposed to other entities through Mca and Mcc reference points. Reference point Mcn is used for accessing underling network service entities. A network services entity (NSE) provides services from the underlying network to the CSEs.

BRIEF DESCRIPTION OF THE DRAWINGS

So that the present disclosure may be understood by those of ordinary skill in the art, a more detailed description may be had by reference to aspects of some illustrative implementations, some of which are shown in the accompanying drawings. The appended drawings, however, illustrate only some example features of the present disclosure and are therefore not to be considered limiting, for the description may admit to other effective features.

Figure 1A:
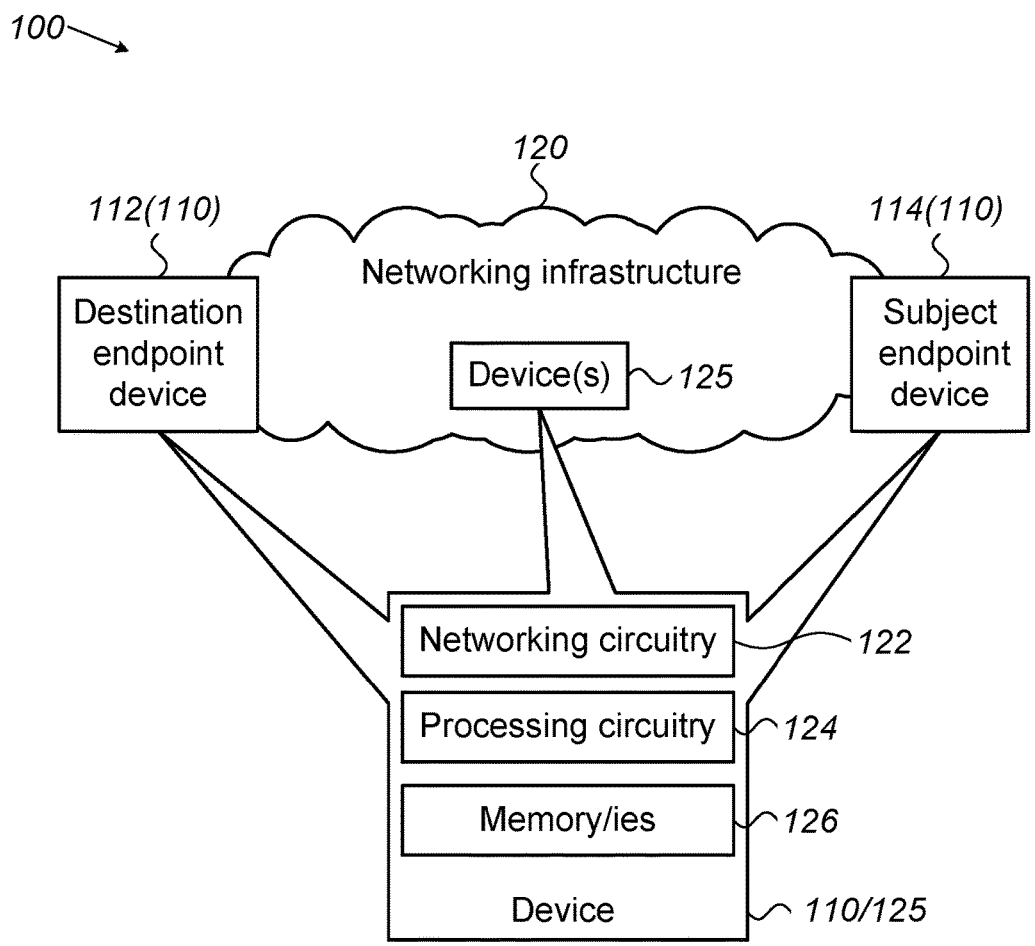
FIG. 1A illustrates a network, in accordance with some embodiments of the presently disclosed subject matter.

In accordance with common practice the various features illustrated in the drawings may not be drawn to scale. Accordingly, the dimensions of the various features may be arbitrarily expanded or reduced for clarity. In addition, some of the drawings may not depict all of the devices, blocks, stages, etc. of a given network, method, etc.

DESCRIPTION OF EXAMPLE EMBODIMENTS

Overview

There is provided, in accordance with some embodiments of the presently disclosed subject matter, a method performed by a first device, comprising intercepting a first communication that is destined for a second device or that is originating from the second device but is not destined for the first device, the first communication requesting data relating to a third device or indicative of data determined by and relating to the third device, subsequent to the intercepting, generating a second communication destined for the second device, wherein the second communication is indicative of data relating to the third device that was determined by at least one of the first device or one or more fourth devices, and sending the second communication.

There is further provided, in accordance with some embodiments of the presently disclosed subject matter a device, comprising networking circuitry, and processing circuitry, wherein the processing circuitry is adapted to intercept communications entering the device via the networking circuitry, wherein the communications are not destined for the device and wherein the communications request data relating to any of one or more other devices or are indicative of data determined by and relating to any of the one or more other devices, collect data relating to any of the one or more other devices, the data that is collected including at least one of: data entering the device via the networking circuitry which was not determined by the one or more other devices, or data determined by the processing circuitry, generate other communications destined for any of one or more destination devices, each other communication indicative of at least part of the data that was collected, and send the other communications via the networking circuitry.

Detailed Description of Example EmbodimenTS

FIG. 1A illustrates a network 100, in accordance with some embodiments of the presently disclosed subject matter.

As shown in FIG. 1A, network 100 includes a plurality of endpoint devices 110 (also referred to herein simply as endpoints) of which two are shown in FIG. 1A, namely device 112 and device 114. Examples of endpoint devices 110 may include, for instance, smartphone(s), laptop(s), personal computer(s), server(s), storage device(s), drive(s), light(s); appliance(s); vehicle(s); trash can(s); heating, ventilating, and air-conditioning; window(s), window shade(s)

and blind(s); door(s); lock(s); sensor(s); actuator(s); robot(s); camera(s), etc. Network 100 further includes one or more devices 125 which are part of a networking infrastructure 120 that supports communication by endpoint devices 110. Device(s) 125 may therefore also be referred to herein as networking infrastructure device(s). Device(s) 125 may vary depending on network 100, and may include any device(s) appropriate for network 100. For example, device(s) 125 may include any of routers, gateways, switches, servers, storage devices, access points (e.g. for Wi-Fi), controllers, cellular base stations, modems, telephone adaptors, Meraki enterprise products, etc. The functionality of devices 125 may relate to the control plane and/or user plane of network 100. Network 100 may in some cases support cloud computing. In such cases, one or more of devices 125 may be in the "cloud".

In some embodiments, network 100 may be an IoT network. In such embodiments, endpoint device(s) 110 may be "thing(s)" of the IoT network, and/or may also be referred to herein as IoT device(s).

Depending on the implementation, any two device(s) 110 and/or 125 may be adapted to communicate in any appropriate manner, e.g. via wireless and/or wired connection(s) in networking infrastructure 120. For example, two or more devices 125 may be adapted to communicate with one another in order to facilitate communication between device 112 and 114. Communication between any two devices 110 and/or 125 may be implemented at least in part via conventional interfaces, such as standardized 3 GPP interfaces, standardized European Telecommunications Standards Institute (ETSI) interfaces, Application program interfaces (APIs) (e.g. representational state transfer (REST or RESTful) APIs, mobility service engine (MSE) REST APIs, Cisco Prime APIs, Meraki APIs, etc.), etc.; and/or may be implemented at least in part via non-conventional interfaces.

Any device 110 or 125 may include any hardware and/or software appropriate for the functionality attributed to the device 110 or 125. Software may include firmware, when suitable. In the example illustrated in FIG. 1A of a particular device 110 or 125, the particular device 110 or 125 includes networking circuitry 122 appropriate for communicating in network 100. Networking circuitry 122 may include components for wireless communication (e.g. any of antenna(s), transmitter(s)/receiver(s), etc.) and/or components for wired communication (e.g. wired network interface(s), wired network switch(es), etc.). In the example illustrated in FIG. 1A, the particular device 110 or 125 further includes processing circuitry 124 for performing functionality attributed herein to the particular device 110 or 125, including functionality relating to communicating via networking circuitry 122 and/or other functionality. Processing circuitry 124 may include, for instance any of the following: processor(s), state machine(s), other type(s) of integrated circuit(s) comparator(s), adder(s), multiplier(s), shift register(s), combinatory logic (such as multiplexer(s), OR gate(s), AND gate(s), XOR gate(s) etc.), electronic component(s) (e.g. resistor(s), inductor(s), capacitor(s), diode(s), transistor(s), other switching component(s), etc.), wiring, etc. Processing circuitry 124 may additionally or alternatively include one or more integrated circuits (e.g. field programmable gate array(s) (FPGA(s)), application specific integrated circuit(s) (ASIC(s)), full-custom integrated circuit(s), etc.), printed circuit boards (also referred to as printed circuit board assemblies), and/or the like, which may for instance comprise circuitry (such as examples of processing circuitry 124 described in the previous sentence) that is suitable for inclusion in such integrated circuit(s), printed circuit board(s) and/or the like. If processor(s) are included in processing circuitry 124, each included processor may be of any suitable type operative to execute instructions, such as a load store processor, a processing pipe, a programmable very long instruction word (VLIW) engine, etc. Processor(s) may include, for example, any of the following: graphics processing unit(s) (GPU(s)), digital signal processor(s) (DSP(s)) central processing units (CPU(s)), etc. Any device 110 or 125 which includes processing circuitry 124 is also referred to herein as a computer.

In the illustrated example, the particular device 110 or 125 further includes at least one memory 126. Each memory 126 may be of any appropriate type such as an optical computer readable storage medium, a magnetic computer readable storage medium, or an electronic computer readable storage medium. If there is a plurality of memories 126, any two memories 126 in the plurality may be of the same type or different types. The at least one memory 126 may include, for instance, any of the following: volatile, non-volatile, erasable, non-erasable, removable, non-removable, writeable, re-writeable memory, for short term storing, for long term storing, etc., such as registers, read-only memory (ROM), static random access memory (SRAM), dynamic random access memory (DRAM), flash memory, embedded DRAM, etc. In embodiments where processing circuitry 124 includes processor(s), memory/ies 126 may store computer readable program code (also referred to herein as software or instructions), the processor(s) being adapted to execute such computer readable program code in order to perform at least part of the functionality attributed to the particular device 110 or 125. The at least one memory 126 may additionally or alternatively store data relating to the subject matter (e.g. by implementing one or more databases in network 100 which will be described in more detail below).

Optionally, the particular device 110 or 125 includes one or more other modules known in the art such as input/output modules for interacting with users of the device 110 or 125, etc.

It is noted that reference herein to a device (e.g. device 110 or 125) in the single form should be construed to cover embodiments where all of the hardware and/or software that comprises the device is included within a single physical unit (i.e. within a single enclosure), as well as embodiments where not all of the hardware and/or software that comprises the device is included within a single physical unit (i.e. not included within a single enclosure).

Although network 100 is referred to in the single form, network 100 may in some examples comprise sub-parts which may also be referred to as networks, as will be understood by those skilled in the art.

For example, if network 100 includes a mobile network, network 100 may include a radio access network (RAN) and a core network (also referred to as a "packet core"). The mobile network may be a 3GPP network for instance for 2G, 3G, 4G or 5G cellular network technology. A device which connects via a radio access network is also referred to herein as a user equipment (UE). In one particular embodiment, the mobile network may be a 5G narrowband IoT network, (e.g. in accordance with 3GPP release 13), and/or the packet core may be a next generation packet core. Network 100 may additionally or alternatively include the Internet, local area network(s) (e.g. Ethernet, Wi-Fi), and/or other packet data network(s).

In some embodiments, network 100 or a part thereof may be operated by a service provider (e.g. mobile operator); and/or network 100 or a part thereof may be operated by an enterprise, individual or family which also operates at least part of devices 110. For example, a service provider may operate at least part of networking infrastructure 120 (e.g. networking infrastructure of a packet core and RAN that are included in network 100); and an enterprise may operate devices 110 and optionally may also operate a part of networking infrastructure 120. As another example, an enterprise may operate both networking infrastructure 120 and devices 110. Network 100 or any part thereof may be private and/or public.

In examples where network 100 comprises sub-parts (e.g. networks with different protocols), a particular device 125 in networking infrastructure 120 which enables the interfacing between different sub-parts is also referred to herein as a gateway. Such a gateway may for instance perform protocol translation and/or other conversion, as necessary to interface between the different sub-parts. In some embodiments where a gateway interfaces to a mobile network, the gateway may be a UE, adapted to connect via a radio access network of the mobile network.

Figure 1B:
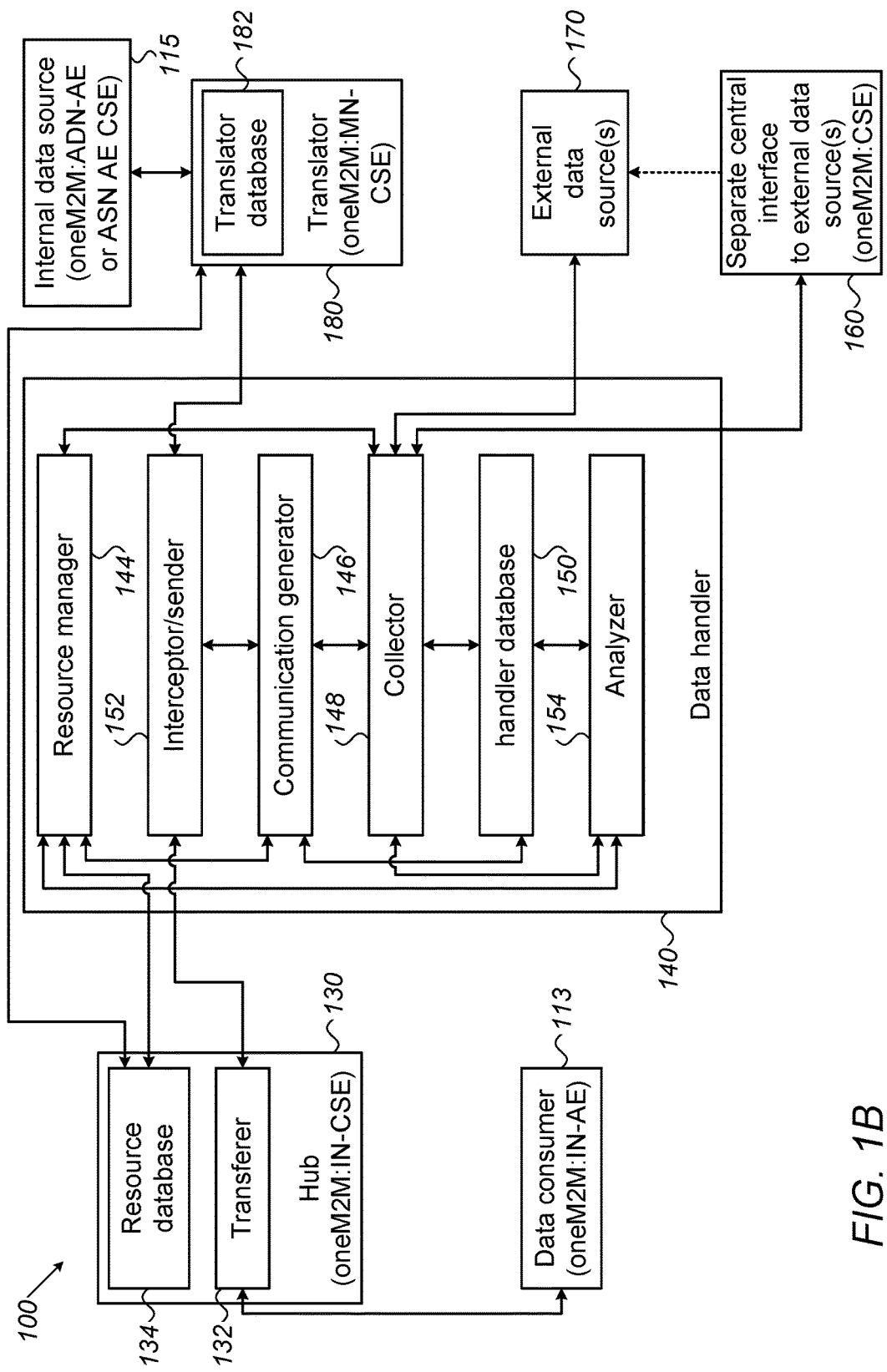
FIG. 1B is a functional block diagram of the network of FIG. 1A, in accordance with some embodiments of the presently disclosed subject matter.

FIG. 1B is a functional block diagram of network 100, in accordance with some embodiments of the presently disclosed subject matter.

For example, FIG. 1B emphasizes the functionality of network 100 which enables data regarding any particular endpoint device 110 (e.g. endpoint device 114 of FIG. 1A) to be provided to other endpoint device(s) 110 in network 100 (e.g. endpoint device 112 of FIG. 1A), even when such data is not determined by the particular endpoint device 110. Consequently, the particular endpoint device 110 may not be required to have the capabilities of determining all data that may be provided regarding the particular endpoint device 110; enabling the particular endpoint device 110 to be simpler and cheaper than if all data which may be provided regarding the particular endpoint device 110 would have to be determined by the particular endpoint device 110. Moreover, not requiring all the data to be determined by the particular endpoint device 110 may enable a lower data rate to be sufficient between the particular endpoint device 110 and networking infrastructure 120.

Endpoint device 112 of FIG. 1A is assumed to be the destination endpoint for data regarding endpoint device 114 which is the subject endpoint. Therefore destination endpoint 112 may perform the functionality of a data consumer (represented by the functional block data consumer 113 in FIG. 1B), or in other words may implement data consumer 113 of FIG. 1B. Subject endpoint 114 may determine some of the data and therefore may perform the functionality of a data source (represented by the functional block internal data source 115 in FIG. 1B) for some of the data, whereas other data may be determined by external data source(s) 170 and/or by a data handler 140 shown in FIG. 1B. Subject endpoint 114 may therefore be referred to as implementing internal data source 115. An endpoint device is termed herein a subject endpoint device or subject device if the endpoint device is the subject of the data, or in other words the data relates to the subject endpoint device; whereas an endpoint device is termed herein a destination endpoint device or destination device if the data is destined for the endpoint device.

For example, consumption of data regarding one or more subject endpoint device 110 in network 100, including regarding subject endpoint 114, by data consumer 113, may include the administration of subject endpoints 110 by data consumer 113. In such an example, destination endpoint device 112 may be used by an end-user such as an administrator responsible for subject endpoint device(s) 110, for obtaining data regarding subject endpoint device(s) 110. Consumption of data regarding subject endpoint(s) 110 (e.g. more specifically administration of subject endpoint device(s) 110) by data consumer 113 may include any appropriate activities such as sending communications (e.g. requests for data regarding subject endpoint device(s) 110), receiving communications (e.g. including data regarding subject endpoint device(s) 110), evaluating received data, acting based on received data, etc. As an example of administration, assuming that the data relates to trash cans when subject endpoint devices 110 are trash cans, acting based on the received data may include scheduling garbage collection, etc.

It is noted that for simplicity's sake, the description herein will refer to a single data consumer 113, consuming data regarding one or more subject endpoint devices 110. However, the functional block data handler 140 and optional functional block(s) hub 130, central interface 160, external data source(s) 170 and/or translator 180 shown in FIG. 1B and which will now be described, may in some embodiments service a plurality of data consumers (e.g. associated with various destination devices 110), each of the data consumers consuming data relating to a respective set of one or more subject endpoint devices 110 performing the functionality of internal data source(s). In such embodiments, there may or may not be overlap in subject endpoint devices 110 between the sets.

The functional block data handler 140 and optional functional block(s) hub 130, central interface 160, external data source(s) 170 and/or translator 180 shown in FIG. 1B may be part of networking infrastructure 120 of FIG. 1A. The functional block(s) 140, 130, 160, 170 and/or 180 may therefore be implemented by one or more devices 125 (FIG. 1A) in networking infrastructure 120 (or in other words one or more devices 125 may perform the functionality represented by functional block(s) 140, 130, 160, 170 and/or 180). The functional blocks may be implemented by any appropriate configuration. For example, any functional block 140, 130, 160, 170 or 180 may represent functionality performed by a single device 125 in networking infrastructure 120, or may represent functionality performed by a plurality of devices 125. As another example, any two or more functional blocks 130, 140, 160, 170 and/or 180 may represent functionality performed by a single device 125 or by a plurality of devices 125. As another example, although hub 130, data handler 140, interface 160, and data source(s) 170 are shown in FIG. 1B in separate functional blocks, part or all of hub 130, data handler 140, interface 160, and data source(s) 170 may be co-located, or may even be in the same physical unit.

Optional hub 130 may be adapted to act as a hub for communications in network 100. Hub 130 may include a resource database 134 where resources relating to network 100 may be registered and state data for the resources may be stored. For example, if resources include data consumer(s) (e.g. including data consumer 113) and/or internal data source(s) (e.g. including internal data source 115), then state data may include identifiers of data consumer(s) and/or internal data source(s) (e.g. identifiers of corresponding destination and/or subject endpoint devices 110). Other examples of resources and state data are described further below. Generally, state data for a resource may include numerical, textual and/or any other type of data descriptive of the state of the resource. Hub 130 may additionally or alternatively include transferer 132 adapted to transfer communications in network 100.

Data handler 140 may be adapted to handle data regarding subject endpoints 110. As such, data handler 140 may include a communication generator 146 adapted to generate a communication for data consumer 113, which is indicative of data regarding subject endpoint 114 that was not determined by internal data source 115, but was instead determined by other source(s) such as external data source(s) 170 and/or data handler 140.

Optionally, the generated communication is also indicative of data regarding subject endpoint 114 that was determined by internal data source 115, and in such a case the data not determined by internal data source 115 may be referred to herein as enriching the data determined by internal data source 115. Data handler 140 may further include an interceptor/sender 152 adapted to intercept communications destined for data consumer 113 and/or to intercept communications from data consumer 113 that are not destined for data handler (e.g. that are destined for internal data source 115 and/or for translator 180). Depending on the intercepted communication, the intercepted communication may proceed to data consumer 113 or to the other destination (e.g. internal data source 115 and/or translator 180); the intercepted communication may not proceed and instead a communication generated by communication generator 146 may be sent to data consumer 113; or the intercepted communication may proceed and a communication generated by communication generator 140 may additionally be sent to data consumer 113. The term "interception" is used herein because the intercepted communication intercepted by interceptor/sender 152 is not destined for data handler 140. It is noted that communication(s) between data consumer 113 and internal data source 115/translator 180 are optionally communicated via transferer 132 and in such a case interceptor/sender 152 may be adapted to intercept a communication being transferred between transferer 132 and internal data source 115/translator 180. In some examples, interceptor/sender 152 may be adapted to perform the functions of a proxy server in network 100.

Data handler 140 may further include a collector 148 adapted to collect data from external data source(s) 170, optionally via a separate central interface 160, and/or to collect data determined by analyzer 154. Collector 148 may be adapted to provide collected data to communication generator 146, to a resource manager 144 (if included) for registering in resource database 134 and/or to a handler database 150 (if included in data handler 140).

Data handler 140 optionally also includes any of the following functional blocks: resource manager 144, an analyzer 154 and/or handler database 150. Resource manager 144, if included, may be adapted to register resources in resource database 134 for which state data is to be determined by external data source(s) 170 and/or by analyzer 154; and optionally to provide to, and/or receive from, the resource database 134 the state data for such resources. Such state data may be the most recent state data for respective resources collected by collector 148. The most recent collected state data that was collected for a resource may be current state data (e.g. reflective of the current state of the resource as of the time of determination of the state data), and/or predicted state data (e.g. reflective of a predicted future state of the resource that was most recently determined as of the time of collection).

Handler database 150, if included, may be adapted to store the most recent data collected by collector 148 relating to subject device(s) 110. The most recent collected data may be reflective of current data regarding subject device(s) 110 (e.g. current state(s) of resource(s)) as of the time of determination; and/or may be reflective of predicted future data regarding subject devices 110 (e.g. predicted future state(s) of resource(s)) that was most recently determined as of the time of collection. Handler database 150 may be additionally or alternatively adapted to store previously collected data (e.g. previously collected state data for resources) collected by collector 148. Previously collected data, collected prior to the most recent collecting (e.g. at various times prior to the most recent collecting), is also referred to herein as historical collected data or historical data.

Analyzer 154, if included, may be adapted to analyze data that was collected, such as data that was not yet stored or will not be stored, data stored in handler database 150, and/or data stored in resource database 134 (e.g. which analyzer 154 may be adapted to obtain via resource manager 144). Analyzer 154 may further be adapted, based on a result of the analysis to perform one or more actions. Such action(s) may include, for instance, any of the following: determining data (e.g. current data and/or predicted future data) relating to subject endpoints 110 for provision to collector 148 (e.g. in case such data is used by communication generator 146 for formulating communications); determining changes in resources (e.g. including proposing resource(s) to resource manager 144 for registering in resource database 134); and/or determining changes in collection (e.g. including proposing to collector 148 to collect data which was not previously collected).

A communication generated by communication generator 146 may be indicative of data regarding subject endpoint 114, for instance:
  a. by being indicative of data regarding subject endpoint 114 from an intercepted communication (e.g. intercepted by interceptor 152),
  b. by being indicative of data regarding subject endpoint 114 that was collected by collector 148 and provided by collector 148 to communication generator 146,
  c. by being indicative of data regarding subject endpoint 114 that is stored in resource database 134,
  d. by being indicative of data regarding subject endpoint 114 that is stored in handler database 150, and/or
  e. by being indicative of any other data regarding subject endpoint 114.

It is noted that data relating to subject endpoint 114 may not necessarily exclusively relate to subject endpoint 114, and may in some cases also relate to other subject endpoint(s) 110. For example, data regarding a collection of subject endpoints 110 that includes subject endpoint 114 may be considered to be related to subject endpoint 114 although not exclusively.

A communication may be indicative of specific data in any appropriate manner, such as by including the specific data, by including an identifier for retrieving the specific data, etc. For example, data stored in resource database 134, or an identifier for retrieving such data, may be retrieved by resource manager 144 and provided to communication generator 146 for inclusion in a generated communication. As another example, data stored in handler database 150, or an identifier for retrieving such data, may be retrieved by communication generator 146 from handler database 150 for inclusion in a generated communication. As another example, data in an intercepted communication, or an identifier in an intercepted communication for retrieving such data may be provided by interceptor/sender 152 to communication generator 146 for inclusion in a generated communication. As another example, collector 148 may provide data that was collected to communication generator 146 for inclusion in a generated communication, etc. An example of an identifier for retrieving specific data may be a uniform resource identifier (URI) for retrieving specific data such as the most recent collected data and/or previously collected data from resource database 134, from handler database 150, or from any other database (such as a translator database 182 to be described further below). A communication may include the indication (e.g. the specific data, an identifier for retrieving the specific data, etc.), for instance, in the payload, in header(s), etc. of the communication.

In some examples where network infrastructure 120 includes a packet core, hub 130 and/or data handler 140 may be implemented in the packet core. Additionally or alternatively, for example, at least part of hub 130 (e.g. including resource database 134) may be implemented in the cloud. Additionally or alternatively, the routing table of transferer 132, and the routing table(s) of translator 180 and/or internal data source 115, may be implemented such that interceptor/sender 152 is the default gateway for communications being transferred between transferer 132 and translator 180/internal data source 115. Additionally or alternatively, for example, interceptor/sender 152 may be adapted to intercept communications by being implemented such that interceptor/sender 152 may intercept communications being transferred from the mobility management entity (MME) on the T6a interface, such as communications including data payloads over the control plane (e.g. data carried short message service SMS); and/or may intercept communications being transferred from the Serving Gateway/PDN Gateway (SPGW) on the SGi interface, such as communications carrying regular user plane payloads.

Optional external data source(s) 170 may represent any appropriate functionality for determining data regarding subject endpoint 114 (and optionally other subject endpoints 110) in network 100. For example, external data source(s) 170 may represent detecting and/or computing functionality. Determination of data by data source(s) 170 and/or by data handler 140 may occur in response to a request from collector 148, and/or independently of any request by collector 148. If occurring independently, the determination may occur periodically and/or upon the occurrence of one or more events. Device(s) 125 which implement external data source(s) 170 may also be referred to herein as source devices. In some examples where network infrastructure 120 includes a packet core and a radio access network, external data source(s) 170 may be implemented in the packet core and/or in the radio access network.

Optional translator 180 may represent protocol translation and/or other conversion functionality between a sub-part of network 100 which implements internal data source 115, and another sub-part of network 100 which implements interceptor/sender 152. Translator 180 optionally also represents other functionality such as dynamic discovery of new devices, device management, security and access rights, subscription and notification, and/or data management and repository. Translator 180 may include translator database 182 for storing data determined by internal data source 115. For example, resources may be registered in translator database 182 (e.g. by internal data source 115) for state data that is to be determined by internal data source 115. Resources for state data determined by internal data source 115 may be registered in translator database 182 (e.g. by internal data source 115) and/or in resource database 134 (e.g. by translator 180 and/or by internal data source 115). State data determined by internal data source 115 may be stored in translator database 182 (e.g. by internal data source 115) and/or in resource database 134 (e.g. by translator 180 and/or by internal data source 115). In some embodiments where data determined by internal data source 115 is stored, translator 180 and/or internal data source 115 may formulate communications for data consumer 113 using stored data (e.g. stored in translator database 182), and/or using identifiers for retrieving such stored data. Translator 180 and/or internal data source 115 may additionally or alternatively formulate communications for data consumer 113 using data that was not stored.

In some embodiments translator 180 may be omitted, e.g., if internal data source 115 is not implemented by a different sub-part of network 100 than interceptor/sender 152. In some embodiments, hub 130 may be omitted, e.g. if registration of resources at hub 130 does not take place. In some embodiments, separate central interface 160 may be omitted, e.g. if collector 148 interfaces directly to external data source(s) 170. In some embodiments, external data source(s) 170 may be omitted, e.g. if data not determined by internal data source 115 may be determined by data handler 140. In some embodiments, a translator may be added between data consumer 113 and hub 130, e.g. if data consumer is implemented by a different sub-part of network 100 than hub 130.

Any of the functional blocks (113, 115, 130, 132, 134, 140, 144, 146, 148, 150, 152, 154, 160, 170, 180, 182 in any of the above) shown in FIG. 1B may be implemented by hardware and/or software included in one or more devices 110 and/or 125 shown in FIG. 1A. It should be understood that the functional blocks of FIG. 1B are presented to simplify the discussion of the subject matter, and that in some embodiments, the functionality attributed herein to any two or more functional blocks may be performed by a consolidated functional block; the functionality attributed herein to any single functional block, may be distributed among two or more functional blocks; and/or functionality attributed herein to a particular functional block may be performed in addition or instead by one or more other functional blocks. It should also be understood that the lines shown in FIG. 1B between the functional blocks are for illustration of certain possible interactions between functional blocks, and that in some embodiments there may be fewer, more and/or different interactions between the functional blocks than illustrated in FIG. 1B.

As mentioned above, in some embodiments, network 100 may be an IoT network in which the oneM2M model may be applied. In such embodiments, resources may be registered in accordance with the oneM2M model, and the communications in network 100 may be in accordance with the oneM2M model (e.g. in accordance with the communication management requirements specified in TS-0002-V2.7.1 and/or in other oneM2M specification(s)). In accordance with the oneM2M model, for instance, the following operations may be performed in network 100: create, retrieve, update, delete, and notify. An appropriate device 125 (e.g. server) in networking infrastructure 120 (FIG. 1A) may include an IN-CSE (infrastructure common service entity). IN-CSE may be software which, in conjunction with processor(s) 124 adapted to run the software, may at least partly implement hub 130 (FIG. 1B). For example, the IN-CSE, in conjunction with processor(s) 124 adapted to run the software and in conjunction with memory/ies 126 for storing data, may at least partly implement a register (e.g. resource database 134—FIG. 1B) of hub 140. Destination endpoint device 112 (FIG. 1A) may include an IN-AE (infrastructure application entity), for example, software for consuming data regarding subject device 114 (1A) and optionally other subject devices 110 (e.g. where the software in conjunction with processor(s) 124 which are adapted to run the software, may at least partly implement data consumer 113 of FIG. 1B). If subject device 114 is a light, for instance, then the software may remotely control the light. In another instance, if subject device 114 is a trash can, then the software may manage collection of trash from the trash can. The IN-AE may register to the IN-CSE. An appropriate gateway 125 in networking infrastructure 120 (FIG. 1A) may include a middle node common service entity (MN-CSE). MN-CSE may be software which, in conjunction with processor(s) 124 adapted to run the software, may at least partly implement translator 180 (FIG. 1B). For example, the MN-CSE, in conjunction with processor(s) 124 adapted to run the software and in conjunction with memory/ies 126 for storing data, may at least partly implement a register (e.g. translator database 182—FIG. 1B) of translator 180. The MN-CSE may register to the IN-CSE. A subject endpoint 114 may include an application dedicated node application entity (ADN-AE), e.g. which registers to a CSE (e.g. to MN-CSE and/or to IN-CSE), or may include an application service node (ASN) AE and CSE. The ASN-CSE may register to the MN-CSE and/or to the IN-CSE. For example, the ADN or ASN may include software, which in conjunction with processor(s) 124 adapted to run the software, may at least partly implement internal data source 115. It is noted that when reference is made herein to MN/ASN-CSE, the reference should be understood to refer to either or both the MN-CSE or the ASN-CSE. A device 125 in networking infrastructure 120 (FIG. 1A) may include another CSE. The other CSE may be software which, in conjunction with processor(s) 124 adapted to run the software, may at least partly implement central separate interface 160 (if included in network 100). For convenience sake, such oneM2M terms are shown in brackets on FIG. 1B.

Figure 2:
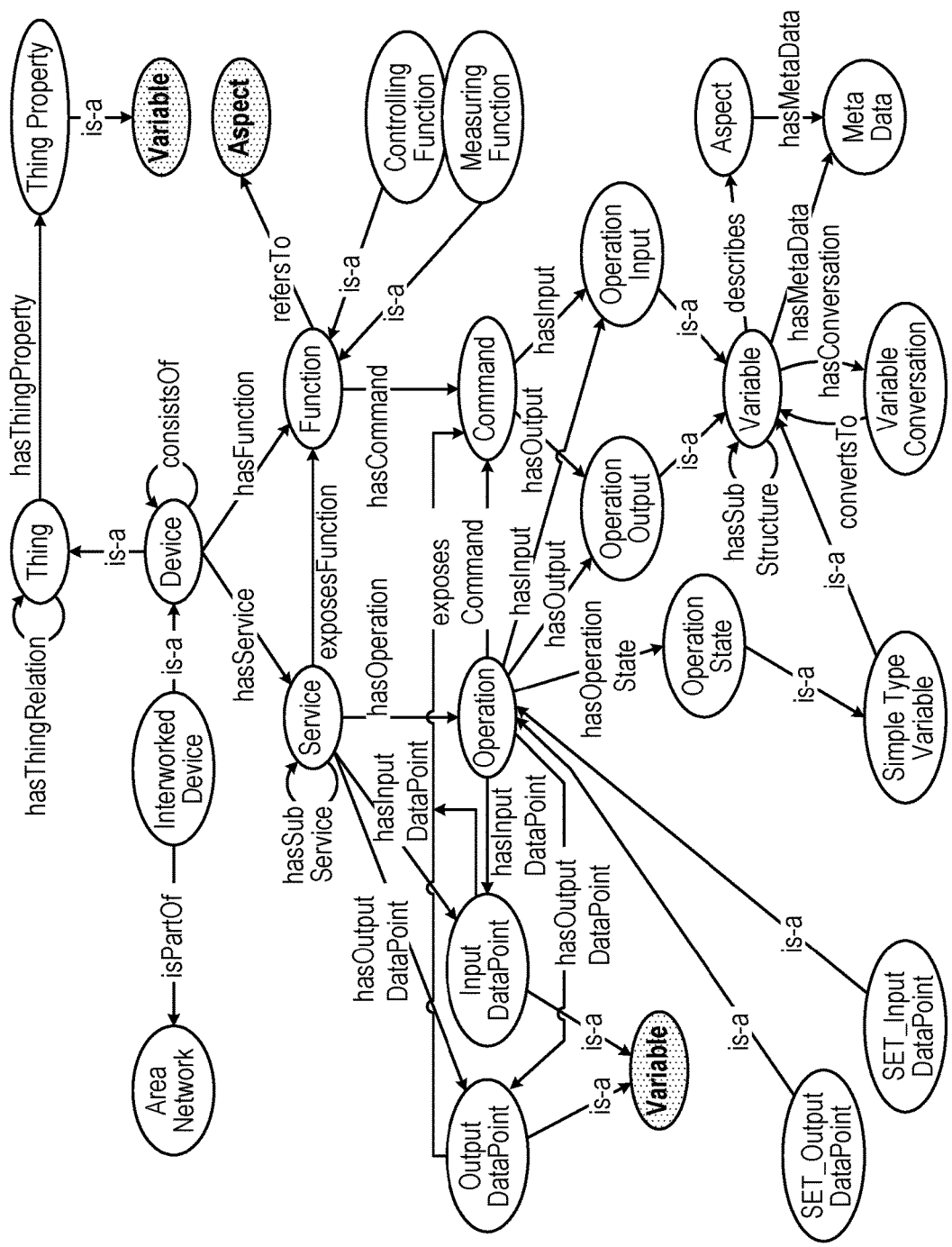
FIG. 2 illustrates a oneM2M base ontology, in accordance with some embodiments of the presently disclosed subject matter.

FIG. 2 illustrates a oneM2M base ontology, in accordance with some embodiments of the presently disclosed subject matter. The oneM2M ontology shown in FIG. 2 includes classes of: thing, thing property, device, area network, interworked device, variable, aspect, service, function, controlling function, measuring function, command, operation, input datapoint, output datapoint, operation state, operation input, operation output, set_output datapoint, set_input datapoint, simpletype variable, variable conversion, metadata, etc.; and the relationship between such classes. A class shown with shading indicates that the class appears more than one time in FIG. 2. If the oneM2M standard is used in network 100, then one or more of such classes may be registered as resources. The state data of registered resources may vary. For example, the state data may vary over time, may vary depending on the configuration of network 100, may vary depending on the characteristics of endpoint devices 110, etc. Some classes such as the variable class, aspect class, etc., may not be registered as resources but may instead function as placeholders (e.g. containers) for the state data of certain registered resources.

Figure 3:
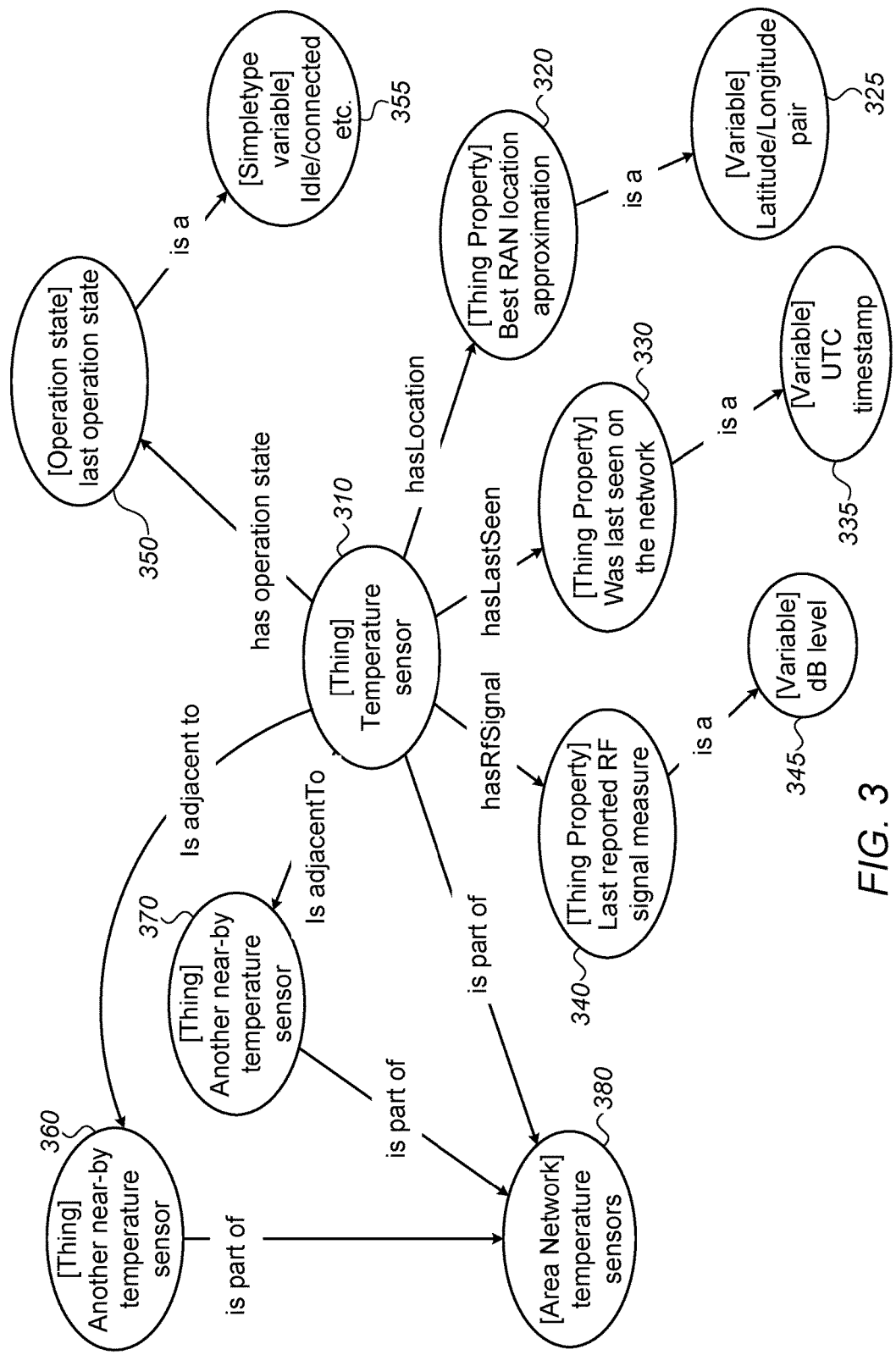
FIG. 3 illustrates an example of the usage of the oneM2M ontology, in accordance with some embodiments of the presently disclosed subject matter.

FIG. 3 illustrates an example of the usage of the oneM2M ontology, in accordance with some embodiments of the presently disclosed subject matter. More specifically, FIG. 3 relates to subject endpoint 114 and shows certain examples of classes which may be registered as resources; the state data of the registered resources determined by device(s) 125 in networking infrastructure 120. Such device(s) 125 may implement external data source(s) 170 and/or data handler 140.

For simplicity's sake, FIG. 3 may not necessarily show certain intermediate classes and certain relationships between classes. In the example of FIG. 3, it is assumed that network 100 includes a RAN and that subject endpoint device 114 is a temperature sensor. Therefore thing 310 is "temperature sensor". Temperature sensor 310 is related by "has location" to a thing property 320 "best RAN location approximation". Best RAN location approximation 320 is related by "is a" to a variable "latitude/longitude pair" 325. Temperature sensor 310 is related by "has last seen" to a thing property 330 "was last seen on the network". Was last seen on the network 330 is related by a "is a" to a variable "UTC timestamp" 335. Temperature sensor 310 is related by "has RF signal" to a thing property 340 "last reported radio frequency (RF) signal measure" 340. Last reported RF signal measure 340 is related by a "is a" to a variable "decibel (dB) level" 345. Temperature sensor 310 is related by "has operation state" to an operation state 350 "last operation state". Last operation state 350 is related by "is a" to a simpletype variable "idle, connected, etc." 355. Temperature sensor 310 is related by "is adjacent to" to one or more other temperature sensors, of which two are shown: a "thing another near-by temperature sensor" 360, and a "thing another near-by temperature sensor" 370. Temperature sensor 310, another near-by temperature sensor 360, and another near-by temperature sensor 370 are all related by "is part of" to an area network 380 "temperature sensors".

It should be understood that FIG. 3 is not meant to be comprehensive and may be broadened, changed, or narrowed depending on the data that is to be determined by external data source(s) 170 and/or by data handler 140, the type of subject endpoint device 114 to which the data is related, etc. Additionally or alternatively, FIG. 3 may include resource(s) whose state data is determined by internal data source 115 implemented by subject endpoint device 114.

Examples of collector 148, separate central interface 160 and external data source(s) 170 relating to collection of data will now be provided with reference to FIGS. 4 to 8. The examples assume that network infrastructure 120 includes a packet core conforming with a 3GPP architecture, e.g. for 2G, 3G, 4G or 5G.

Figure 4:
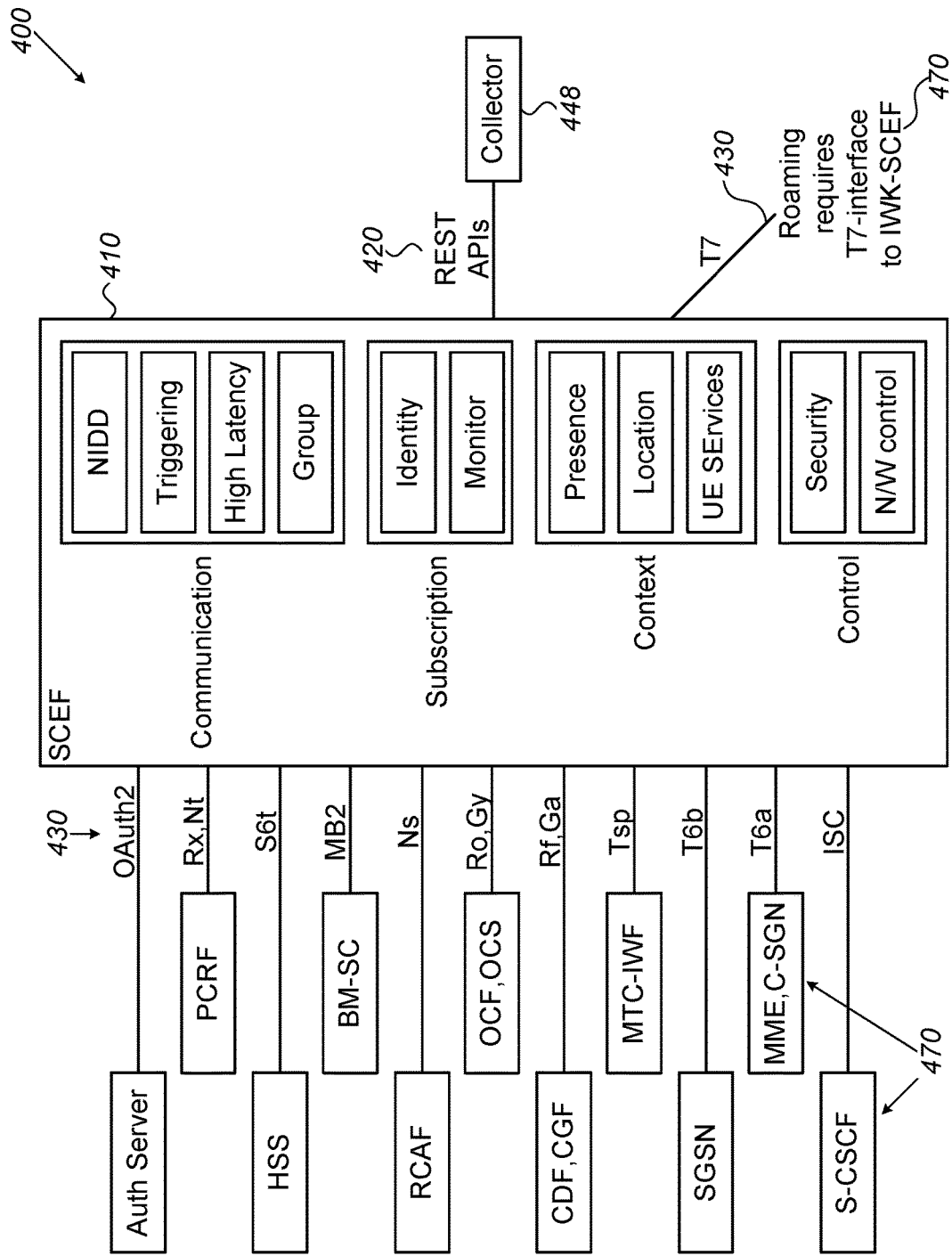
FIG. 4 illustrates a collection architecture, in accordance with some embodiments of the presently disclosed subject matter.

FIG. 4 illustrates a collection architecture 400, in accordance with some embodiments of the presently disclosed subject matter.

Collection architecture 400 is an example of indirect interface collection, because in collection architecture 400 the collection by a collector 448 is performed via a separate central interface, namely a service capability exposure function (SCEF) 410, which may be used for various purposes, not necessarily all of which are related to the subject matter. For example, SCEF 410 may be used for communication, subscription, context, and control purposes. SCEF 410 may be an example of separate central interface 160 of FIG. 1B.

Collector 448 may be an example of collector 148 (FIG. 1B), and data sources 470 may be examples of external data source(s) 170 of FIG. 1B. Collector 448 may act as an application server to SCEF 410. Data sources 470 may include an authorization server, a home subscriber server (HSS), a RAN Congestion awareness function (RCAF), a charging data function (CDF), a charging gateway function (CGF), a serving general packet radio service support node (SGSN), a serving call state control function (S-CSCF), a policy and charging rules function (PCRF), a broadcast multicast service center (BM-SC), an online charging function (OCF), an online charging system (OCS), a machine type communications interworking function (MTC-IWF), an interworking SCEF (IWK-SCEF) and/or an MME cellular IoT serving gateway node (MME,C-SGN). REST APIs 420 may be used to pull information from SCEF 410. Interfaces 430 between SCEF 410 and data sources 470 may include OAuth2, Rx, Nt, S6t, MB2, Ns, Ro, Gy, Rf, Ga, Tsp, T6b, T6a, ISC, and/or T7.

Figure 5:
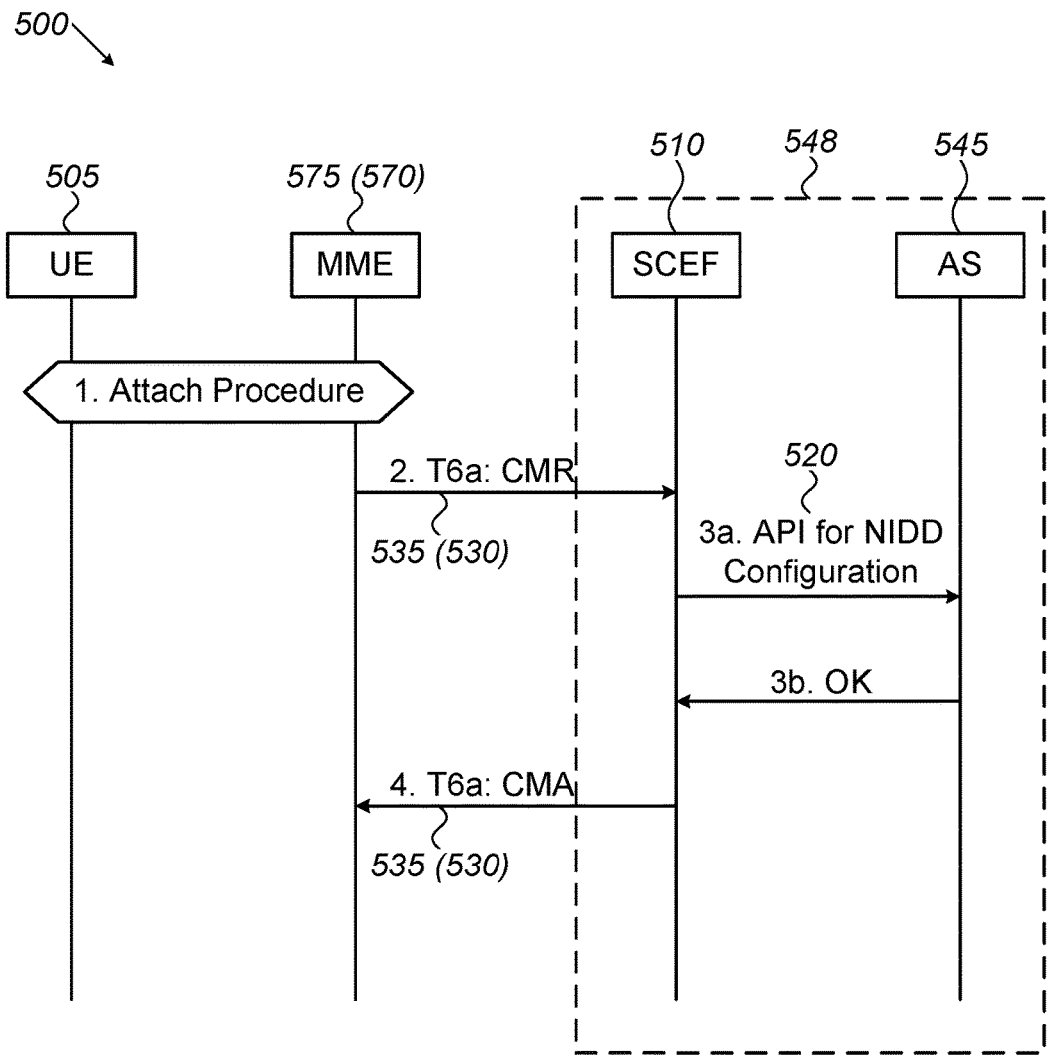
FIG. 5 illustrates another collection architecture, in accordance with some embodiments of the presently disclosed subject matter.

FIG. 5 illustrates another collection architecture 500, in accordance with some embodiments of the presently disclosed subject matter. Collection architecture 500 is an example of direct interface collection, because the collection is performed via an integrated central interface 510, namely an integrated SCEF which is used exclusively to collect data for the subject matter.

For example, data may be collected from data source(s) 570, data source(s) 570 being an example of external data source(s) 170 (FIG. 1B). Collector 548 may be an example of collector 148 of data handler 140 (FIG. 1B). Collector 548 includes an application server (AS) 545, and includes the integrated SCEF 510 which is dedicated to the purposes of the subject matter.

In FIG. 5, data source(s) 570 include MME 575; and interface(s) 530 between data source(s) 570 and integrated SCEF 510 include a T6a interface 535 between MME 570 and integrated SCEF 510. An API 520 for non-IP data delivery (NIDD) configuration is used between integrated SCEF 510 and AS 545. A UE 505 is shown using an attach procedure with MME 575. UE 505, for example may be a an endpoint device or gateway (e.g. destination endpoint device 112 or a gateway, such as a 4G hotspot, connected to destination endpoint device 112 via wireless and/or wired connection(s)). In some embodiments, data source(s) 570 may include other relevant entity/ies in addition to or instead of MME 575, such as relevant entity/ies of a packet core and/or of a RAN, e.g. HSS, PCRF, etc. In such embodiments interface(s) 530 may include other interface(s), in addition to or instead of T6a, such as S6t, Rx, Nt, etc.

Figure 6:
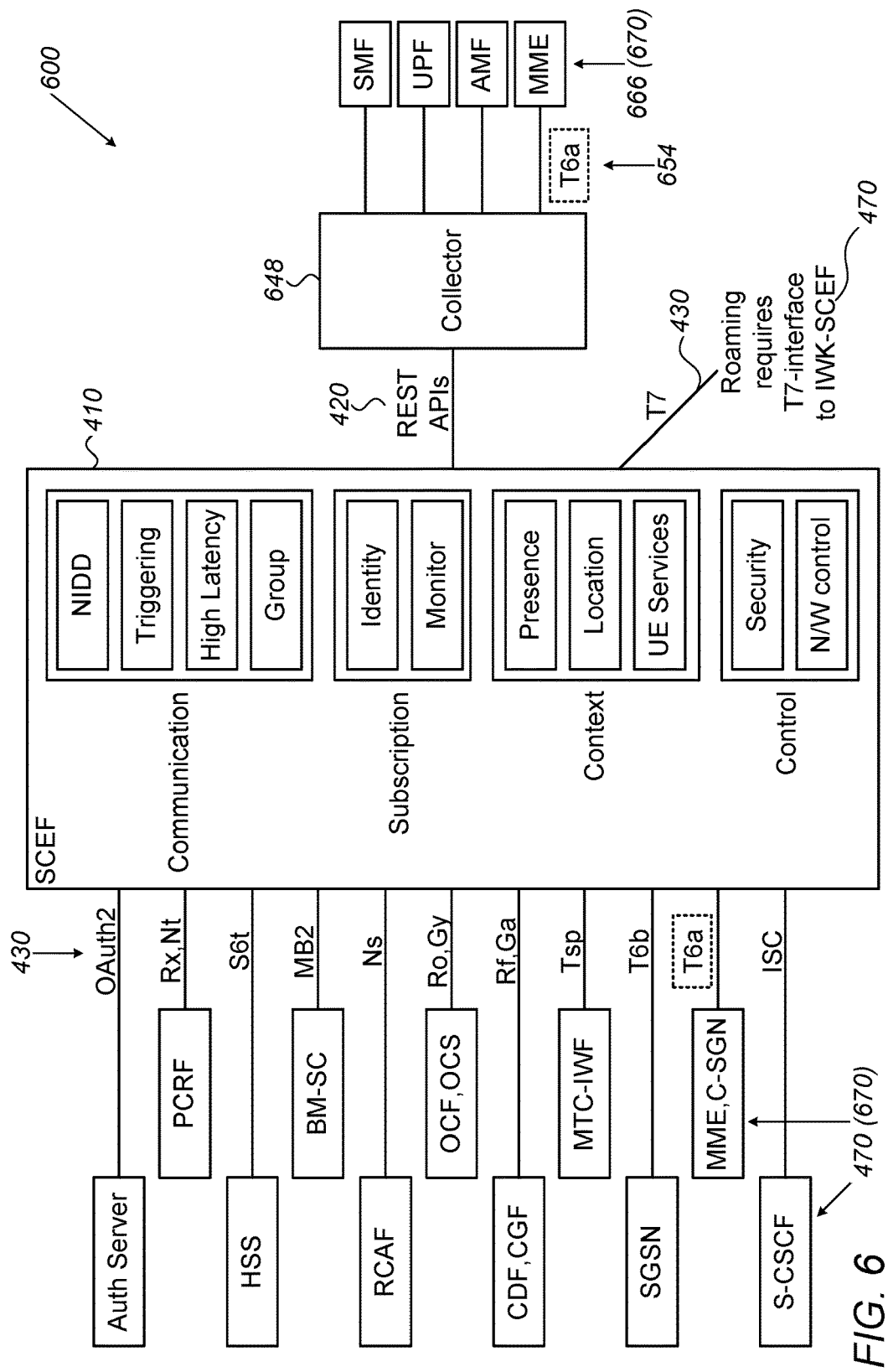
FIG. 6 illustrates yet another collection architecture, in accordance with some embodiments of the presently disclosed subject matter.

FIG. 6 illustrates yet another collection architecture 600, in accordance with some embodiments of the presently disclosed subject matter. Collection architecture 600 is an example of indirect interface collection, where the collection is via a separate central interface, as well as being an example of direct interface collection.

In FIG. 6 as in FIG. 4, SCEF 410 is used for various purposes, not necessarily all of which are related to the subject matter. For example, SCEF 410 may be used for communication, subscription, context, and control purposes. Collector 648 may be an example of collector 148 (FIG. 1B), and data sources 670 may be examples of external data source(s) 170 (FIG. 1B). Collector 648 may act as an application server to SCEF 410. Data sources 670 may include data sources 470 such as an authorization server, an HSS, an RCAF, a CDF, a CGF, an SGSN, an S-CSCF, a PCRF, a BM-SC, an OCF, an OCS, an MTC-IWF, an IWK-SCEF, and/or an MME, C-SGN. Such data sources 470 may interface with SCEF 410 via interfaces 430 such as an OAuth2, Rx, Nt, S6t, MB2, Ns, Ro, Gy, Rf, Ga, Tsp, T6b, T6a, ISC, and/or T7. Data sources 670 may further include data sources 666 such as a session management function (SMF), user plane function (UPF), and access and mobility function (AMF) which interface directly via interface(s) 654 to collector 648, or in other words do not interface via SCEF 410. For example, MME is shown interfacing via T6A 430 to SCEF 110, as well as directly via T6a 654 to collector 648. Session management data from SMF and/or UPF 666, and data from northbound interfaces to AMF and/or MME 666 may be useful to collect, e.g. when at least part of subject endpoint devices 110 are conventional UEs such as 4G devices. Also shown in FIG. 6 are REST APIs 420 to pull information from SCEF 410.

Additionally or alternatively to collection architectures 400, 500 and 600 discussed with reference to FIGS. 4 to 6, data from external data sources 170 (e.g. entities included in a radio access network) may be transported to data handler 140 by adding headers to UDP packets, e.g. in accordance with the IETF PLUS initiative.

Additionally or alternatively to collection architectures 400, 500 and 600 discussed with reference to FIGS. 4 to 6 and depending on network 100, the implementation of an appropriate collection architecture for network 100 may include any other appropriate interfacing in addition to and/or instead of the specific types of interfacing discussed with reference to FIGS. 4 to 6. For example, collector 148 may use mobility service engine (MSE) REST APIs to interface to external data source(s) 170 which are wireless access points, collector 148 may use Cisco Prime APIs to interface to external data source(s) 170 which are wired routing/switches, collector 148 may use Meraki APIs to interface to external data source(s) 170 which are Meraki enterprise products, etc.

Figure 7:
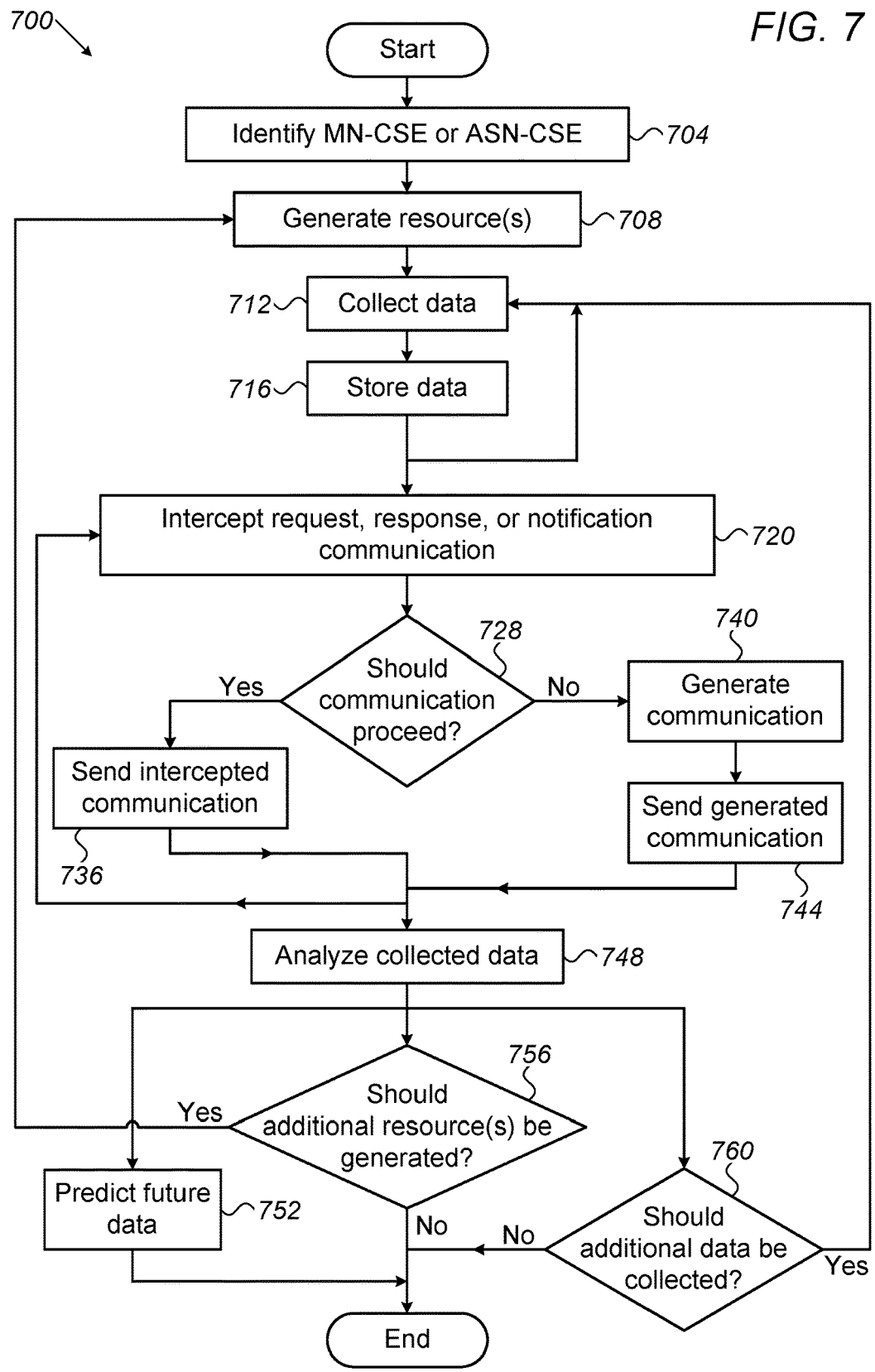
FIG. 7 is a flowchart of a method, in accordance with some embodiments of the presently disclosed subject matter.

FIG. 7 is a flowchart of a method 700, in accordance with some embodiments of the presently disclosed subject matter. Method 700 may be performed for network 100. Method 700 is described with reference to destination endpoint device 112 and subject endpoint device 114 of FIG. 1A, but may be applied to any suitable endpoint devices 110. Method 700 is further described with reference to the functional blocks of FIG. 1B, but functionality relevant to performance of method 700 may be implemented in any other appropriate way. It should be understood that a stage attributed to a functional block may be equivalently attributed to a device 110 or 125 which implements the functional block.

In optional stage 704, an MN-CSE or ASN-CSE is identified (e.g. by data handler 140) for an endpoint device such as endpoint device 114. Data handler 140 may identify the MN-CSE or ASN-CSE by intercepting the registration of the MN-CSE or ASN-CSE to the IN-CSE. For example, if network 100 includes a mobile network, the MN-CSE or ASN-CSE may be included in the attaching UE (e.g. subject endpoint device 114 or an appropriate gateway 125 which implements translator 180) from the RAN perspective. Stage 704 may be omitted, for instance, if communication in network 100 is not in accordance with the oneM2M standard, or if identification is not required to perform the remainder of method 700.

In optional stage 708, one or more resources are generated (e.g. by resource manager 144 of data handler 140) relating to subject endpoint device 114, wherein the state data of the resource(s) are to be determined by source(s) other than internal data source 115 (e.g. are to be determined by any of external data source(s) 170 and/or data handler 140). For example, resource manager 144 may generate the resource(s) by registering the resource(s) in resource database 134.

Such resource(s) may be generated in stage 708 in addition to at least one resource generated concurrently, beforehand, and/or afterwards whose state data is to be determined by internal data source 115. The generation of resource(s) whose state data is to be determined by internal data source 115 may be performed by the MN-CSE/ASN-CSE identified in stage 704. The latter generation may include registering resource(s) in resource database 134, and/or registering resource(s) in a database implemented at least partly by MN-CSE/ASN-CSE (e.g. translator database 182). Optionally, other resource(s) relating to network 100 may additionally or alternatively be generated.

Resource generation may be supported by the "create" operation if the OneM2M model is being used. Stage 708 may be repeated for additional resources relating to subject endpoint device 114 as necessary (e.g. if necessary based on a result of an analysis by analyzer 154—see stage 756 below) or may be performed for all resources all at once. Generation of the resource(s) may include specification of relationship(s) among the generated resource(s) and/or between the generated resource(s) and previously generated resource(s)

Stage 708 may be omitted if the oneM2M model is not being used for communication in network 100, or if stage 708 is not required to perform the remainder of method 700.

In stage 712, data is collected (e.g. by collector 148 of data handler 140) from source(s) other than internal data source 115 (e.g. from external data source(s) 170 and/or from analyzer 154 of data handler 140). For example, the collection in stage 712 from any of external data source(s) 170 may utilize any of collection architectures 400, 500 or 600 discussed with reference to FIG. 4, 5 or 6, and/or any other collection architecture discussed herein.

In embodiments where resource(s) are generated in stage 708, the collected data may include state data for one or more of the resource(s) generated in stage 708. The collected state data may be stored for the respective resource(s) in resource database 134, e.g. by resource manager 144 of data handler 140.

In optional stage 716, the collected data may be stored (e.g. by collector 148 of data handler 140) in handler database 150. Stage 716 may be omitted, for instance, if historical collected data is not used (e.g. by analyzer 154 or by communication generator 146 of data handler 140). The collected data may be anonymized prior to storage.

Depending on the embodiment, stage 712 and optionally stage 716 may be performed one or more times in method 700. For example, stage 712 may be performed periodically, or upon any appropriate event. Appropriate event(s) may include, for instance, changed or additional data becoming available due to being determined (e.g. when changed state data for a resource, or data for an additional resource, is determined). Appropriate event(s) may additionally or alternatively include, for instance, stage 720 occurring meaning that an iteration of stage 712 and optionally stage 716 may follow an iteration of stage 720. Appropriate event(s) may additionally or alternatively include, for instance, a proposal that additional data that was not previously collected is to be collected based on a result of an analysis of analyzer 154—see stage 760 below; etc. If the collected data includes current and/or predicted state data then each time new current or predicted state data for the same resource is collected, the new current or predicted state data may be used to update resource database 134 for the respective resource.

It is noted that for the data that is collected, determination of the data by external data source(s) 170 and/or by data handler 140 may occur in response to a request from collector 148, and/or independently of any request by collector 148. If occurring independently, the determination may occur periodically and/or upon the occurrence of one or more events that are independent of any request by collector 148.

In stage 720, a request communication originating from the data consumer 113 that is not destined for data handler 140 (e.g. that is destined for translator 180 or internal data source 115), a notification communication that is destined for data consumer 113, or a response communication that is destined for data consumer 113 is intercepted (e.g. by interceptor/sender 152 of data handler 140). The request communication may request data relating to subject endpoint device 114 (e.g. that was or will be determined by internal data source 115, and/or by other source(s) such as external data source(s) 170 and/or data handler 140). The notification communication may be indicative of data (e.g. state data for at least one resource) determined by internal data source 115. The response communication may be in response to an earlier intercepted request communication. The response communication may be indicative of data (e.g. state data for at least one resource) determined by internal data source 115.

Interception in stage 720 may be performed for protocols supported by OneM2M operations such as HTTP, COAP, MQTT, etc.; and/or may be performed for other protocol(s). For example, in accordance with the oneM2M model, the operation "retrieve" may be representative of a request communication, and the operation "notify" may be representative of a notification communication. In other examples, the request communication may be a JSON request, an XML request, etc. The interception of a communication may include proxying the request, response, or notification communication between hub 130 (e.g. in the oneM2M model, more specifically between IN-CSE that is at least partly implementing hub 130) and data handler 140. When the interception includes proxying, interceptor/sender 152 may be adapted to act as a proxy server.

In stage 728 it is determined (e.g. by interceptor/sender 152 of data handler 140) if the intercepted communication is to proceed to the destination thereof, such as to data consumer 113, internal source 115, or translator 180 (e.g. in the one M2M model more specifically to IN-AE, or to MN/ASN-CSE). Depending on the embodiment, an intercepted communication may proceed under various circumstances. For example, it may be determined that intercepted request communications proceed, but intercepted response communications and intercepted notification communications do not proceed. As another example, it may be determined that intercepted communications (whether they be request, response or notification communications) proceed (and in such an example, stage 728 may be omitted). As another example, certain selectively determined request, response and/or notification communications may proceed but others may not proceed. Under selective determination, for instance, a request communication may not proceed if the requested data is determinable by source(s) other than internal source 115, whereas a response communication may not proceed if the request communication, which triggered the response communication, requested data that is partly determinable by source(s) other than internal source 115. Additionally or alternatively under selective determination, a notification communication, or a response communication whose triggering request communication did not request data determinable by source(s) other than internal source 115), may not proceed if additional and/or changed data relating to subject endpoint device 114 has been collected by collector 148. The changed data may differ from data indicated in an earlier iteration of stage 740 (see below description of stage 740), if any; and/or the additional data may be in addition to data indicated in an earlier iteration of stage 740, if any. If there was no earlier iteration of stage 740 with respect to data consumer 113 and internal source 115, then any collected data may be considered as additional data. Continuing with describing the latter instance of selective determination, for a oneM2M implementation, the changed data may be updated current/predicted state data for one or more previously generated resources, and/or the additional data may be current/predicted state data for one or more newly generated resources.

In stage 728, if it was determined that the intercepted communication should proceed, then in stage 736 the intercepted communication is sent (e.g. by interceptor/sender 152) to the destination (e.g. data consumer 113, internal data source 115, or translator 180). Stages 740 and 744 may then be omitted.

If instead in stage 728, it is determined that the intercepted communication should not proceed to the destination, then method 700 omits stage 736 and continues to stage 740. Additionally or alternatively, in some embodiments, any intercepted communication may proceed to the destination in stage 736, and in addition stage 740 may be performed under certain circumstances. For example, stage 740 may be performed in addition, after a request communication is intercepted that requests data that is at least partly determinable by source(s) other than internal data source; and/or after a request communication is intercepted provided that changed and/or additional data has been collected since the last iteration of stage 740. In such embodiments, stage 728 may be omitted, or may be modified to determine whether or not stage 740 should also be performed.

In stage 740, a communication is generated (e.g. by communication generator 146 of data handler 140). The communication is destined for data consumer 113 (e.g. in the one M2M model, more specifically for IN-AE). It is noted that if the intercepted communication was a response or notification communication, then the generated response or notification communication may be destined for the destination for which the intercepted communication was destined (e.g. data consumer 113). If the intercepted communication was a request communication, then the generated response communication may be destined for the sender of the request communication (e.g. data consumer 113).

The generated communication may be indicative of data relating to subject endpoint device 114 that was not determined by internal data source 115, but determined by other source(s) such as external data source(s) 170 and/or data handler 140.

In some embodiments, the generation of the generated communication may include enriching the intercepted communication (e.g. notification communication or response communication from subject endpoint device 114) to generate the generated communication. In such a case the generated communication may be indicative of both data determined by internal data source 115, and also of data determined by other source(s) such as external data source(s) 170 and/or data handler 140.

The data relating to subject endpoint 114 that the generated communication is indicative of may not necessarily exclusively relate to subject endpoint 114, and may in some cases also relate to other subject endpoint(s) 110.

The generated communication may be indicative of data, for instance, by including the data and/or by including URI(s) to retrieve the data. For example the URI(s) may be URI(s) corresponding to the data in any of resource database 134, handler database 150 and/or translator database 182. The data and/or the URI(s) (and/or any other indication of the data) may be included, for instance, in a payload and/or in header(s) of the generated communication. Continuing with describing such an instance, data, URI(s) and/or any other indication of the data may be included in the payload of a response communication to a "retrieve" request, in a payload of a "notify" operation communication, in a payload of a JSON or XML response communication, and/or in an extra header of a response communication packet, etc. If the oneM2M model is applicable, the data indicated in the generated communication may include state data, and the generated communication may be indicative of state data (whether determined by internal data source 115, and/or determined by other source(s) such as data handler 140 and/or external data source(s) 170, etc.), by including the state data and/or by including URI(s) to the state data that is in one or more databases such as resource database 134 and/or translator database 182.

In stage 744, the generated communication is sent (e.g. by interceptor/sender 152 of data handler 140). The sent response or notification communication may subsequently be received by data consumer 113.

In some embodiments, the sending of the generated communication may include proxying the generated communication between hub 130 (e.g. in the oneM2M model, more specifically between IN-CSE that is at least partly implementing hub 130) and data handler 140. When the sending includes proxying, interceptor/sender 152 may be adapted to act as a proxy server.

Any of stages 720 to 744 may be repeated for additional communications sent by or destined for data consumer 113, which relate to subject endpoint device 114.

Any of stages 704 to 744 may be repeated for other subject endpoint device(s) 110 regarding which data is consumed by data consumer 113, e.g. for administration purposes.

In optional stage 748, collected data (e.g. stored in resource database 134 and/or in handler database 150) may be analyzed (e.g. by analyzer 154 of data handler 140). For example the analyzed data may include data determined by internal data source 115 relating to subject endpoint device 114; data determined by other internal data source(s) of other subject endpoint device(s) 110 relating to the other subject endpoint device(s) 110; data determined by other source(s) that are not internal data sources (such as external data source(s) 170 and/or data handler 140), relating to subject endpoint device 114 and/or other subject other endpoint device(s) 110; etc. The analyzed data may include the most recent collected data and/or historical collected data. A result of the analysis may be stored in handler database 150. Additionally or alternatively, the result may be used for future action(s) such as performance of any of stage(s) 752 to 760 described below. Additionally or alternatively, the result may be communicated, for instance to data consumer 113, e.g. in communication(s) generated by communication generator 146 in stage 740 or in other communication(s) independent of any interception of communications. The analysis performed in stage 748 may include any suitable analysis. For example, the analysis may include statistics regarding the usage of certain endpoint devices in given areas, analytics of certain endpoint devices' mobility from RAN antenna sites to others, etc.

In optional stage 752, based on the result of the analysis, analyzer 154 may predict future data relating to subject endpoint device 114 and/or other subject endpoint device(s) 110. For instance, assuming that the oneM2M model is applied, if subject endpoint device 114 is a pollution sensor, the pollution sensor may determine pollution current state data for a resource of pollution. The historical collected pollution state data that was collected over time and current pollution state data for the various pollution sensors (e.g. data stored in handler database 150) may be used to train analyzer 154 so that analyzer 154 may predict the future pollution state data of a particular pollution sensor (e.g. subject endpoint device 114) during a march in the city. The training may result in an appropriate machine learning model which may then be applied to predict the future pollution state. In another instance, if subject endpoint device 114 is a trash can, the historical and/or current data of percentage full on various days of the week and/or times of day, may be used to train analyzer 154 to predict when the trash should be emptied. The future data (e.g. future pollution state data, future trash collection day/time) determined by analyzer 154 may then be collected by collector 148.

The future data (e.g. future pollution state data, future trash collection time/day, etc.) may be indicated to data consumer 113. For example, the data indicated in communication(s) generated by communication generator 146 in stage 140 may include future data determined by analyzer 154. Additionally or alternatively, future data determined by analyzer 154 may be indicated in a communication independent of any interception of communications.

In optional stage 756, based on the result of the analysis, it is determined (e.g. by analyzer 154) whether additional resources should be generated, and/or particular resources be deleted. If it is determined that additional resource(s) are to be generated, stage 708 may be repeated for subject endpoint device 114 and/or other subject endpoint device(s) 110. If it is determined that particular resource(s) are to be deleted, then resource manager 144 may delete one or more resources for subject endpoint device 114 and/or other subject endpoint device(s) 110. Stage 756 may be omitted, if analysis is not performed.

In optional stage 760, based on the analysis, it is determined (e.g. by analyzer 154) whether additional data relating to subject endpoint device 114 and/or other subject endpoint device(s) 110 is be collected; and/or whether certain data relating to subject endpoint device 114 and/or other subject endpoint device(s) 110 that is being collected is to stop being collected. If it is determined that additional data is to be collected, then collector 148 may collect such additional data in a repetition of stage 712. If it is determined that certain data is to stop being collected, then collector 148 may not collect such data in a repetition of stage 712. Stage 760 may be omitted, if analysis is not performed.

For example, assuming the oneM2M model, the current state data of the location resource(s) for more than one endpoint device (e.g. subject endpoint device 114 and other subject endpoint device(s) 110) may have been collected in stage 712 and may have been analyzed in stage 748 (e.g. by analyzer 154 of data handler 140). The result of the analysis may cause analyzer 154 to propose the generation (e.g. by resource manager 144 of data handler 140) of an area network resource and/or a quantity resource for the quantity of subject endpoint devices 110 in the area. Such resource(s) may be considered to relate to subject endpoint device 114, even though also relating to other subject endpoint devices 110. Referring to the instance of subject endpoint device 114 being a pollution sensor discussed with reference to stage 752, the area network resource and quantity resource may relate to the pollution sensor and to other pollution sensors in the vicinity of the pollution sensor (e.g. connecting to the same cell, such as the same 5G cell, in a mobile network included in network 100). Such resource(s) may be generated (e.g. by resource manager 144) in a repetition of stage 708.

Continuing with describing the latter example, the result of the analysis may additionally or alternatively cause analyzer 154 to propose collecting current state data for other resource(s) (e.g. for the area network resource and/or quantity resource). Analyzer 154 may consequently determine certain current state data (e.g. current quantity for the quantity resource), for instance, from individual pollution sensor data (e.g. stored in resource database 134, stored in handler database 150, or not yet stored). Additionally or alternatively, certain current state data (e.g. identifiers of pollution sensors in the area for the area network resource) may have already been determined by analyzer 154 during the analysis of stage 748. Analyzer 154, for instance, may determine the current quantity and/or identifiers based on the location resource current state data of various pollution sensors (e.g. stored in resource database 134 or handler database 150, or not yet stored). The current state data (e.g. identifiers and/or current quantity) which analyzer 154 proposes to collect may be collected by collector 148, in a repetition of stage 712.

Stages 748 to 760, if performed, may be performed periodically or upon the occurrence of one or more events, such as data consumer 113 requesting that an analysis be performed.

Method 700 may then end.

In some embodiments, method 700 may include more, fewer, and/or different stages than illustrated in FIG. 7. In some embodiments, the order of stages may differ from the order illustrated in FIG. 7. In some embodiments, stages that are shown in FIG. 7 as being performed sequentially may be performed in parallel, and/or stages that are shown as being performed in parallel may be performed sequentially. In some embodiments, the iteration of various stages may differ from the iteration illustrated in FIG. 7.

Method 700 may be repeated with respect to one or more other data consumers 113, if any, in network 100.

Dataflow diagrams which are in accordance with the oneM2M standard are now presented to further illustrate the subject matter.

Figure 8:
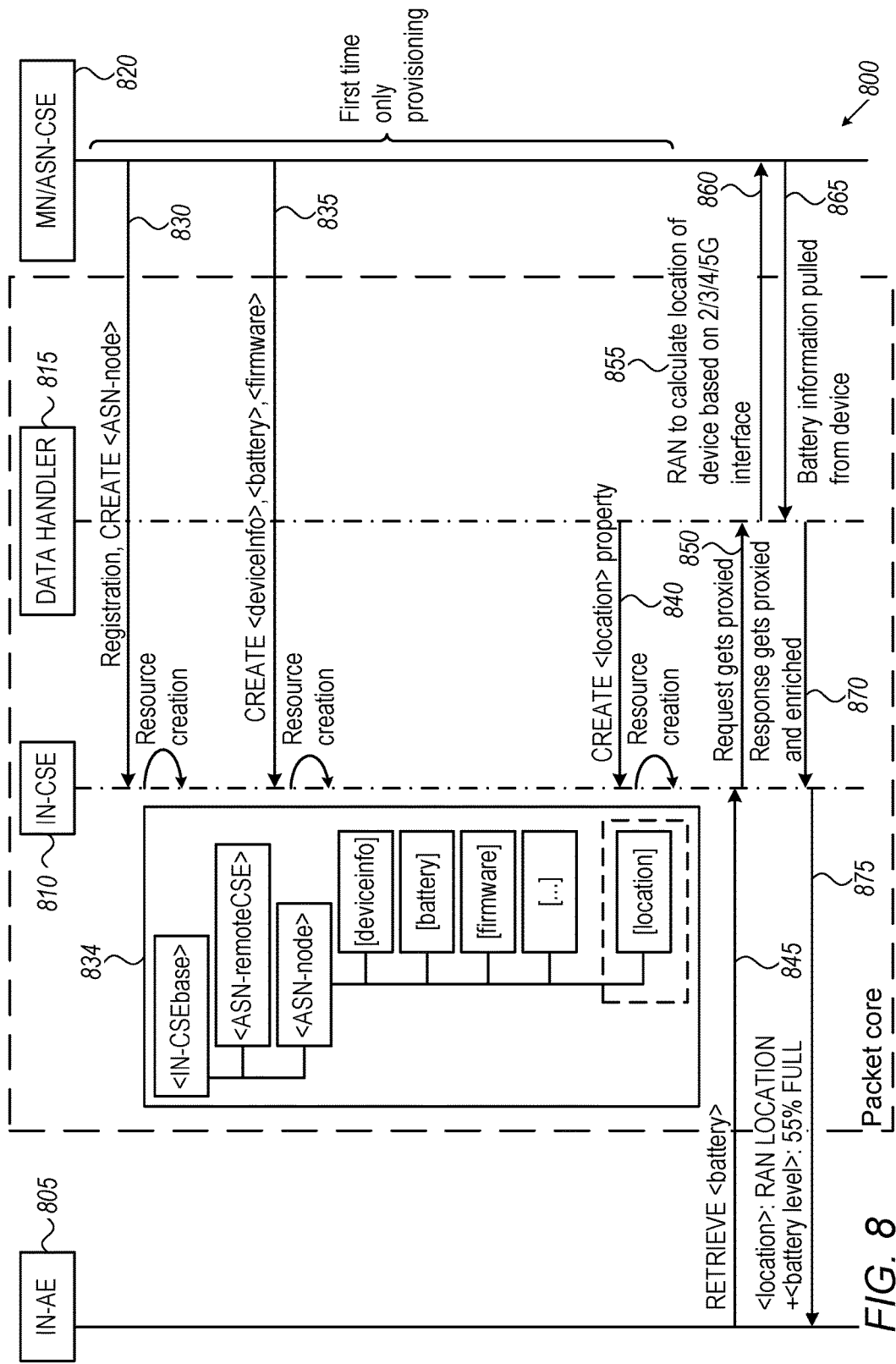
FIG. 8 is a dataflow diagram, in accordance with some embodiments of the presently disclosed subject matter.

FIG. 8 is a diagram of a dataflow 800, in accordance with some embodiments of the presently disclosed subject matter.

Dataflow diagram 800 illustrates an example in accordance with the oneM2M standard, including an IN-AE 805, an IN-CSE 810, a data handler 815, and an MN/ASN-CSE 820. Data handler 815 and IN-CSE 810 may be, for instance, in a packet core of a mobile network. Data handler 815 may be an example of data handler 140 of FIG. 1B.

In stage 830, MN/ASN-CSE 820 generates a "thing" resource, namely an ASN-node resource for subject endpoint device 114 of FIG. 1A. The ASN-node resource is generated by registering the resource in an IN-CSEbase 834 in IN-CSE 810. IN-CSEbase 834 may be an example of resource database 134 of FIG. 1B. The ASN-node resource may be registered in IN-CSEbase 834, as being related to an ASN-remoteCSE resource, which is assumed to have already been registered.

In stage 835, MN/ASN-CSE 820 generates one or more "thing property" resources relating to the ASN-node resource, such as resources for device information, for battery information and for firmware information. Such resources are generated by registering the resources in IN-CSEbase 834.

In stage 840, data handler 815 generates one or more "thing property" resources relating to the ASN-node resource, such as a location resource. The location resource is generated by registering the resource in IN-CSEbase 834. Stage 840 may be an example of stage 708 of FIG. 7.

In the oneM2M model, the resources mentioned in stages 830, 835 and 840 may be registered in IN-CSEbase 834 by using one or more "create" operations. The resources may all be related as shown in IN-CSE 834.

In stage 845, IN-AE 805 sends a request destined for MN/ASN-CSE 820. The request asks for the current state data for the battery resource. The request is received by IN-CSE 810. In oneM2M, the retrieve operation may be used for the request.

In stage 850, data handler 815 intercepts the request, including proxying the request. The interception in stage 850 may be an example of stage 720 of FIG. 7.

In stage 855, data handler 815 collects the current state data for the location resource from the 2G, 3G, 4G or 5G RAN which is adapted to determine the value, e.g. based on triangulation. The location current state data may include, for instance, the longitude and latitude. Stage 855 may be an example of stage 712 of method 700, where the location current state data is determined by external data source(s) 170 (FIG. 1B) that are RAN entity/ies.

In stage 860, the request is forwarded by data handler 815 to MN/ASN-CSE 820. The forwarding of the request results in a pulling of the battery information determined by the ASN (i.e. the ASN of subject endpoint device 114). Depending on the embodiment, the ASN may have determined the battery information independently of the request or in response to the request. The forwarding in stage 860 may be an example of stage 736 of method 700.

In stage 865, the response is sent by MN/ASN-CSE 820 to data handler 815. The response includes the battery information determined by the ASN. The response is intercepted by data handler 815. The interception of the response in stage 865 may be an example of stage 720 of method 700.

In stage 870, the response from MSN/ASN-CSE 820 is proxied and enriched by data handler 815. The response sent by data handler 815 that is destined for IN-AE 805 includes the location current state data determined by the RAN, as well as the battery current state data (e.g. 55% full battery level) determined by the ASN. The enrichment in stage 870 may be an example of stage 740 of method 700, and the proxying of stage 870 may be an example of stage 744 of method 700.

In stage 875, IN-CSE 810 forwards the response from data handler 815 to IN-AE 805. Dataflow 800 then ends.

Figure 9:
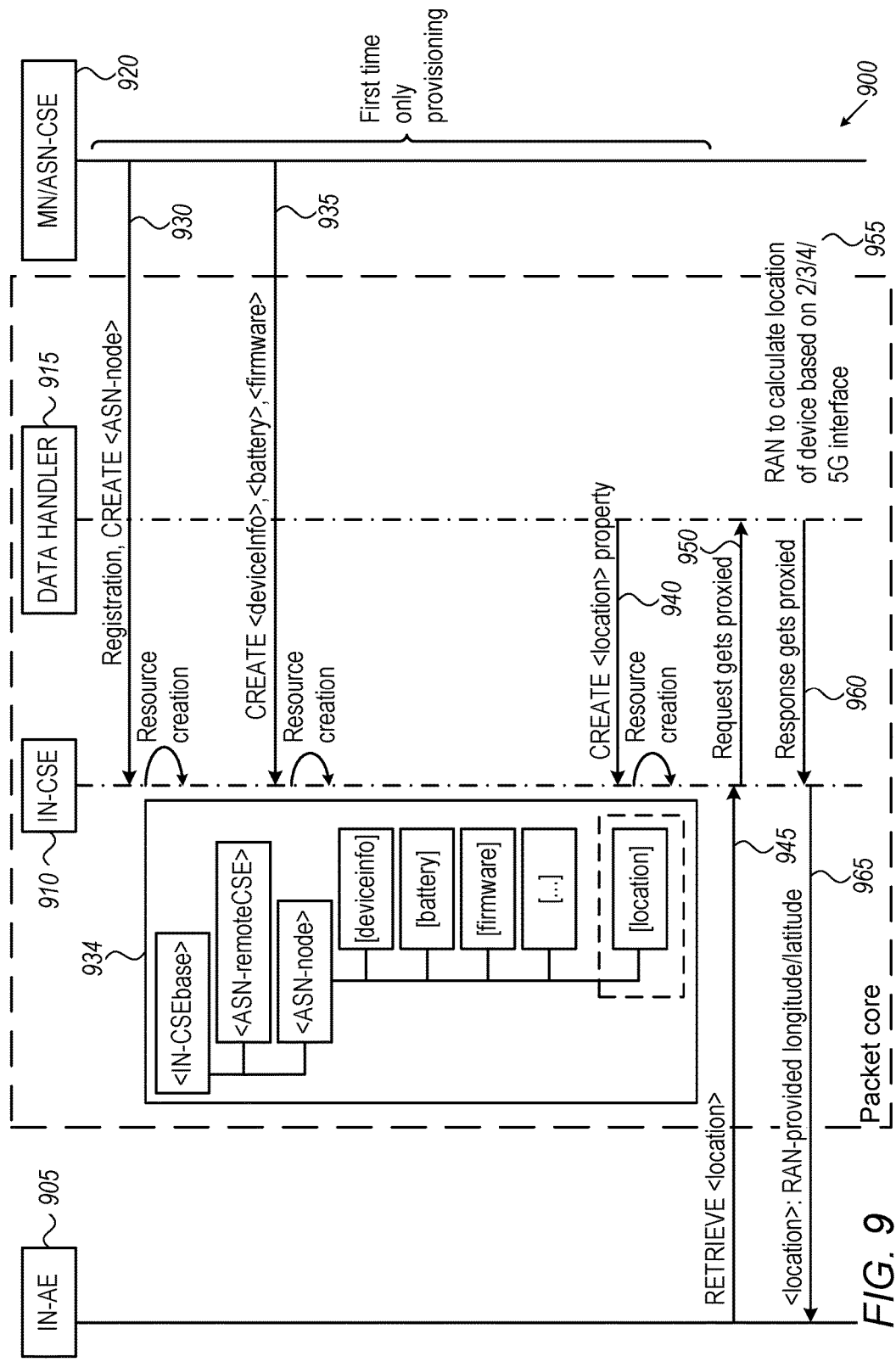
FIG. 9 is another dataflow diagram, in accordance with some embodiments of the presently disclosed subject matter.

FIG. 9 is a diagram of a dataflow 900, in accordance with some embodiments of the presently disclosed subject matter.

Dataflow diagram 900 illustrates an example in accordance with the oneM2M standard, including an IN-AE 905, an IN-CSE 910, a data handler 915, and an MN/ASN-CSE 920. Data handler 915 and IN-CSE 910 may be, for instance, in a packet core of a mobile network. Data handler 915 may be an example of data handler 140 of FIG. 1B.

In stage 930, MN/ASN-CSE 920 generates a "thing" resource, namely an ASN-node resource for subject endpoint device 114 (FIG. 1A). The ASN-node resource is generated by registering the resource in an IN-CSEbase 934 in IN-CSE 910. IN-CSEbase 934 may be an example of resource database 134 (FIG. 1B). The ASN-node resource may be registered in IN-CSEbase 934, as being related to an ASN-remoteCSE resource, which is assumed to have been previously registered.

In stage 935, MN/ASN-CSE 920 generates one or more "thing property" resources relating to the ASN-node resource, such as resources for device information, for battery information and for firmware information. Such resources are generated by registering the resources in IN-CSEbase 934.

In stage 940, data handler 915 generates one or more "thing property" resources relating to the ASN-node resource, such as a location resource. The location resource is generated by registering the resource in IN-CSEbase 934. Stage 840 may be an example of stage 708 of FIG. 7.

In the oneM2M model, the resources mentioned in stages 930, 935 and 940 may be registered in IN-CSEbase 934 by using one or more "create" operations. The resources may all be related as shown in IN-CSE 834.

In stage 945, IN-AE sends a request destined for MN/ASN-CSE 920. The request asks for the current state data for the location resource. The request is received by IN-CSE 910. In oneM2M, the retrieve operation may be used for the request.

In stage 950, data handler 915 intercepts the request, including proxying the request. The interception in stage 950 may be an example of stage 720 of FIG. 7.

In stage 955, data handler 915 collects the current state data for the location resource from the 2G, 3G, 4G or 5G RAN which is adapted to determine the value, e.g. based on triangulation. The location current state data may include, for instance, the longitude and latitude. Stage 955 may be an example of stage 712 of method 700, where the location current state data is determined by external data source(s) 170 (FIG. 1B) that are RAN entity/ies.

The request is not forwarded to MN/ASN-CSE 920, since no current state data is required to be determined by the ASN (i.e. by the ASN of subject endpoint device 114), in order to respond.

In stage 960, the response to the request is generated and proxied by data handler 815. The response sent by data handler 915 that is destined for IN-AE 905 includes the location current state data determined by the RAN. The generation in stage 960 may be an example of stage 740 of method 700, and the proxying of stage 960 may be an example of stage 744 of method 700.

In stage 965, IN-CSE 810 forwards the response from data handler 915 to IN-AE 905. Dataflow 900 then ends.

Figure 10:
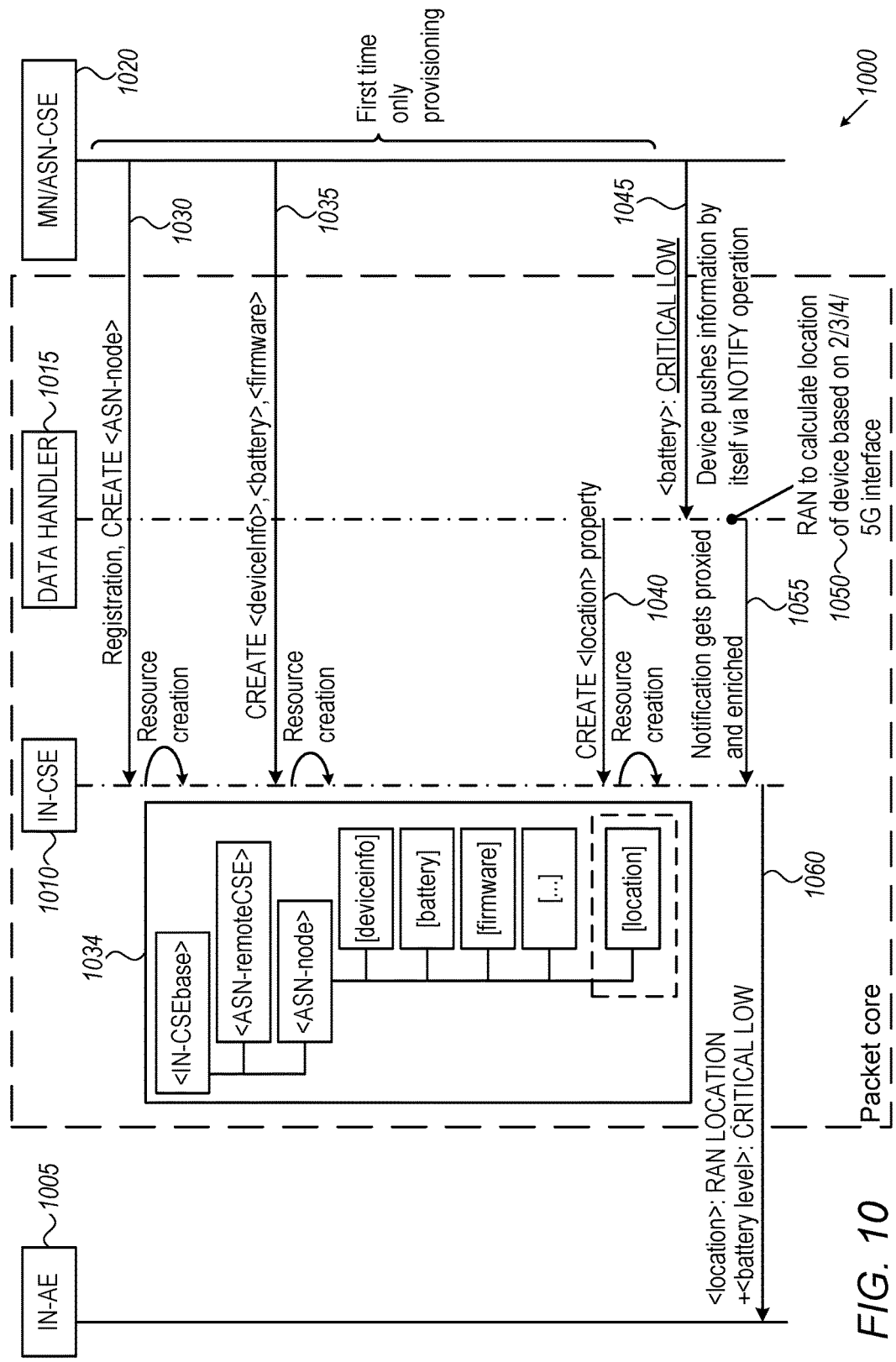
FIG. 10 is yet another dataflow diagram, in accordance with some embodiments of the presently disclosed subject matter.

FIG. 10 is a diagram of a dataflow 1000, in accordance with some embodiments of the presently disclosed subject matter.

Dataflow diagram 1000 illustrates an example in accordance with the oneM2M standard, including an IN-AE 1005, an IN-CSE 1010, a data handler 1015, and an MN/ASN-CSE 1020. Data handler 1015 and IN-CSE 1010 may be, for instance, in a packet core of a mobile network. Data handler 1015 may be an example of data handler 140 of FIG. 1B.

In stage 1030, MN/ASN-CSE 1020 generates a "thing" resource, namely an ASN-node resource for subject endpoint device 114 of FIG. 1A. The resource is generated by registering the resource in an IN-CSEbase 1034 in IN-CSE 1010. IN-CSEbase 1034 may be an example of resource database 134 of FIG. 1B. The ASN-node resource may be registered in IN-CSEbase 1034, as being related to an ASN-remoteCSE, which is assumed to have been previously registered.

In stage 1035, MN/ASNN-CSE 1020 generates one or more "thing property" resources relating to the ASN-node resource, such as resources for device information, for battery information and for firmware information. Such resources are generated by registering the resource in IN-CSEbase 1034.

In stage 1040, data handler 1015 generates one or more "thing property" resources relating to the ASN-node resource such as a location resource. The location resource is generated by registering the resource in IN-CSEbase 1034. Stage 1040 may be an example of stage 708 of FIG. 7.

In oneM2M, the resources mentioned in stages 1030, 1035 and 1040 may be registered in IN-CSEbase 834 by using one or more "create" operations. The resources may all be related as shown in IN-CSE 1034.

In stage 1045, the ASN (i.e. the ASN of subject endpoint device 114) determines that the battery is critically low. Accordingly the ASN generates a notification that the battery is critically low, thereby pushing the battery current state data for the battery information resource. The notification is destined for IN-AE 1005. MN/ASN-CSE 1020 sends a notification that includes the battery current state data, and the notification is intercepted by data handler 1015. The interception of the notification in stage 1045 may be an example of stage 720 of FIG. 7. In the oneM2M model, the notify operation may be used for such a notification.

In stage 1050, data handler 1015 collects the current state data for the location resource from the 2G, 3G, 4G or 5G RAN which is adapted to determine the value, e.g. based on triangulation. Stage 1050 may be an example of stage 712 of method 700, where the location current state data is determined by external data source(s) 170 (FIG. 1B) that are RAN entity/ies.

In stage 1055, the notification is proxied and enriched by data handler 1015. The notification sent by data handler 1015 which is destined for IN-AE 1005 includes the location current state data determined by the RAN as well as the current state data (e.g. critically low) determined by the ASN. The enrichment in stage 1055 may be an example of stage 740 of method 700, and the proxying may be an example of stage 744 of method 700.

In stage 1060, IN-CSE 1010 forwards the notification from data handler 1015 to IN-AE 1005. Dataflow 1000 then ends.

Figure 11:
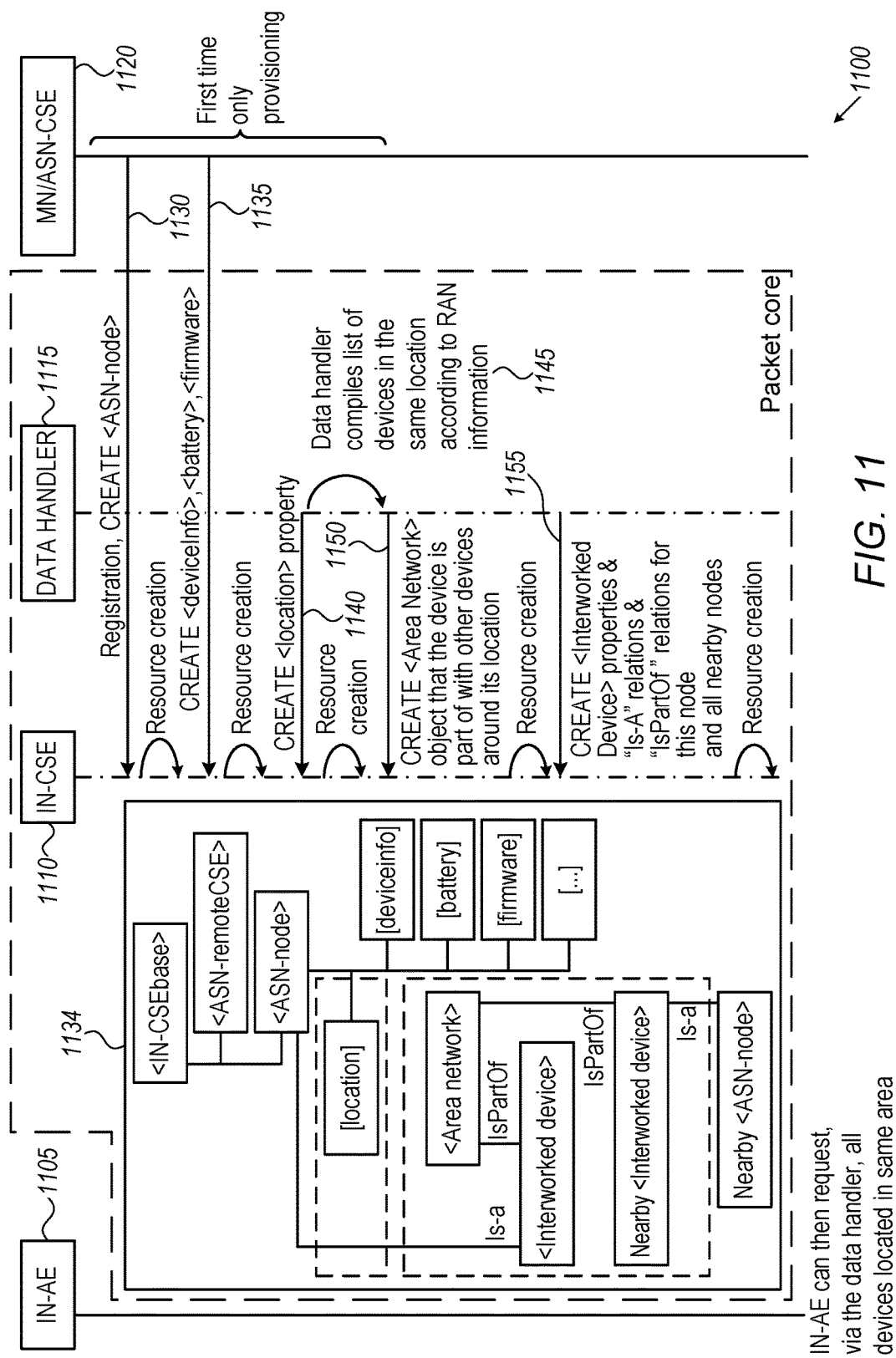
FIG. 11 is still yet another dataflow diagram, in accordance with some embodiments of the presently disclosed subject matter.

FIG. 11 is a diagram of a dataflow 1100, in accordance with some embodiments of the presently disclosed subject matter.

Dataflow diagram 1100 illustrates an example in accordance with the oneM2M standard, including an IN-AE 1105, an IN-CSE 1110, a data handler 1115, and an MN/ASN-CSE 1120. Data handler 1115 and IN-CSE 1110 may be, for instance, in a packet core of a mobile network. Data handler 1115 may be an example of data handler 140 of FIG. 1B

In stage 1130, MN-CSE 1120 generates a "thing" resource, namely an ASN-node resource for endpoint device 114 of FIG. 1A. The resource is generated by registering the resource in an IN-CSEbase 1134 in IN-CSE 1110. IN-CSEbase 1134 may be an example of resource database 134 of FIG. 1B. The ASN-node resource may be registered in an IN-CSEbase 1134, as being related to an ASN-remoteCSE resource, which is assumed to have been previously registered.

In stage 1135, MSN-CSE 1120 generates one or more "thing property" resources relating to the ASN-node resource, such as resources for device information, for battery information and for firmware information. Such resources are generated by registering the resource in IN-CSEbase 1134.

In stage 1140, data handler 1115 generates one or more "thing property" resources relating to the ASN-node resource such as a location resource. The location resource is generated by registering the resource in IN-CSEbase 1134. Stage 1140 may be an example of stage 708 of FIG. 7.

In stage 1145, data handler 1115 compiles a list of endpoint devices 110 at the same location, using RAN information (e.g. the compiled list may be a result of analyzing collected RAN location current state data). Stage 1145 may be an example of stage 748, 760 and/or 712 of FIG. 7.

In stages 1150 and 1155, data handler 1115 generates one or more resources relating to the ASN-node resource, based on the compiled list of stage 1145. For example, an area network resource may be generated in stage 1150 that the ASN-node resource "is part of" (and that other ASN-node resources for other endpoint devices 110 at the location of subject endpoint device 114 may be part of). In stage 1155, interworked device property resources may be generated, including, for example, specification of the relationships between various ASN-node resources, the area network resource and the interworked device property resources. The generation of resources in stage 1150 and 1155 may be an example of stages 756 and 708 of method 700.

Subsequent to stage 1150, IN-AE 1105 may request, via data handler 1115, a list of endpoint devices 110 located in the same area. Dataflow 1100 then ends.

Data flows 800 to 1100 may be modified to rely on payload in JSON responses, payload in XML responses, headers in response communication packets, etc., for conveying data regarding endpoint devices 114 that was not necessarily determined by the endpoint devices 114. For example, such modification may be applied in addition to or instead of the oneM2M model discussed with reference to FIGS. 8 to 11.

Data flows 800 to 1100 are not meant to be comprehensive, and other data flows may be used to illustrate the flow of data in network 100.

Some embodiments of the subject matter may provide any of the following advantages.

First, data relating to a subject endpoint device may be provided to a destination endpoint device without the data being requested by the destination endpoint device.

Second, data relating to a subject endpoint device, which was not requested, may enrich other data relating to the subject endpoint device that was requested. For example, responses and/or notifications to the destination endpoint device may be indicative of both the data and the other data.

Third, in a network that includes a subject endpoint device, networking infrastructure, and a destination endpoint device, data relating to a subject endpoint device that is determined by networking infrastructure device(s) may be received by a destination endpoint device without the destination endpoint device using any APIs (e.g. rest APIs) to request the data. In addition, an SCEF may be optional in such a network.

Fourth, data determined by networking infrastructure device(s) regarding a subject endpoint device may be indicated in the payload of a communication, as if the data were determined by the endpoint device.

Fifth, the oneM2M standard and associated entities thereof (e.g. IN-AE, IN-CSE, MN/ASN-CSE etc.) may be used to support communications.

Sixth, if the network includes a 5G narrowband IoT network, a goal may be to achieve an extended coverage of 20 dB compared to legacy General Packet Radio Service (GPRS) devices, corresponding to achieving a target maximum coupling loss of 164 dB. At such a maximum coupling loss, a data rate of at least 160 bps may be supported at the application layer for both the uplink and downlink. At such a data transfer rate, the design of subject endpoint devices may be cautious regarding the payload and may exclude certain data that may be useful to destination endpoint devices. The subject matter allows for such excluded data to be provided to destination endpoint devices even if excluded by subject endpoint device design.

Seventh, regardless of the type of network, cheaper and/or simpler subject endpoint devices may be designed and deployed in the network, because at least some data regarding the subject endpoint devices may be determined by networking infrastructure device(s). For example, such subject endpoint devices may not be required to include the extra components to determine data that may be determined by networking infrastructure device(s).

Eighth, the subject matter may enable data determined by networking infrastructure device(s) that is not currently exploited, or inefficiently exploited, to be exploited by providing communications indicative of the data to destination endpoint devices, by analyzing the data, etc.

Ninth, if a service provider operates networking infrastructure device(s) which generate communications indicative of data determined by networking infrastructure device(s) regarding subject endpoint device(s), the service provider may be able to provide a solution to operator(s) of the subject endpoint device(s), such as enterprise(s), which allows the operator(s) to have access to more data regarding the subject endpoint devices, without additional investment in, or upgrading of the subject endpoint devices.

Other advantages may be apparent from the description herein.

It will be appreciated that the subject matter contemplates, for example, a computer program product comprising a computer readable medium having computer readable program code embodied therein for executing one or more methods disclosed herein; and/or for executing one or more parts of method(s) disclosed herein, e.g. with reference to any of FIGS. 7 to 11. Further contemplated, for example, is computer readable program code for executing method(s) disclosed herein; and/or for executing part(s) of method(s) disclosed herein. Further contemplated, for example, is a computer readable medium having computer readable program code embodied therein for executing method(s) disclosed herein; and/or for executing part(s) of method(s) disclosed herein.

In the above description of example embodiments, numerous specific details are set forth in order to provide a thorough understanding of the subject matter. However, it will be appreciated by those skilled in the art that some examples of the subject matter may be practiced without these specific details. In other instances, well-known features have not been described in detail so as not to obscure the subject matter.

It will also be appreciated that various features of the subject matter which are, for clarity, described in the contexts of separate embodiments may also be provided in combination in a single embodiment. Conversely, various features of the subject matter which are, for brevity, described in the context of a single embodiment may also be provided separately or in any suitable subcombination.

It will further be appreciated by persons skilled in the art that the presently disclosed subject matter is not limited by what has been particularly shown and described hereinabove. Rather the scope of the subject matter is defined by the appended claims and equivalents thereof:

What is claimed is:

1. A method performed by a first device, comprising:
   intercepting a first communication that is destined for a second device or that is originating from the second device but is not destined for the first device, the first communication requesting data relating to a third device or indicative of data determined by and relating to the third device;
   generating one or more resources relating to the third device;
   collecting state data for the one or more resources, the state data having been determined by one or more devices, the one or more devices including the at least one of the first device or one or more fourth devices;
   subsequent to said intercepting, generating a second communication destined for the second device, wherein the second communication is indicative of data relating to the third device that was determined by at least one of the first device or the one or more fourth devices, wherein the second communication is indicative of state data that was determined by the at least one of the first device or the one or more fourth devices and that was collected; and
   sending the second communication.

2. The method of claim 1, wherein said generating includes enriching the first communication to generate the second communication, the second communication being indicative of both the data determined by and relating to the third device and the data relating to the third device that was determined by the at least one of the first device or the one or more fourth devices.

3. The method of claim 1, wherein the second communication is indicative of location data relating to the third device.

4. The method of claim 1, further comprising:
   collecting the data relating to the third device that was determined by the at least one of the first device or the one or more fourth devices;
   collecting additional data, the additional data including at least one of:
     data relating to the third device that was determined by the at least one of the first device or the one or more fourth devices at various times, or
     data relating to other devices; and
   analyzing the data and the additional data that was collected.

5. The method of claim 4, further comprising:
   based on a result of said analyzing, predicting future data relating to the third device.

6. The method of claim 4, further comprising:
   based on a result of said analyzing, collecting other data that was not previously collected; and
   generating a third communication destined for the second device, the third communication indicative of the other data; and
   sending the third communication.

7. The method of claim 4, further comprising:
   based on a result of said analyzing, generating one or more additional resources relating to the third device.

8. The method of claim 1, wherein a payload of the second communication is indicative of the data relating to the third device that was determined by the at least one of the first device or the one or more fourth devices.

9. The method of claim 1, further comprising:
   storing the data relating to the third device that was determined by the at least one of the first device or the one or more fourth devices, wherein the second communication is indicative of the data relating to the third device that was determined by the at least one of the first device or the one or more fourth devices by including at least one Uniform Resource Identifier (URI) for retrieving the data that was stored.

10. The method of claim 1, wherein at least one of the first communication or the second communication is in accordance with a OneM2M standard, and wherein the first device is included in a packet core of a mobile 3GPP network.

11. A device, comprising:
    networking circuitry; and
    processing circuitry;
    wherein the processing circuitry is adapted to
      intercept communications entering the device via the networking circuitry, wherein the communications are not destined for the device and wherein the communications request data relating to any of one or more other devices or are indicative of data determined by and relating to any of the one or more other devices;

collect data relating to any of the one or more other devices, the data that is collected including at least one of: data entering the device via the networking circuitry which was not determined by the one or more other devices, or data determined by the processing circuitry, wherein the collected data comprises state data for one or more resources;

generate other communications destined for any of one or more destination devices, each other communication indicative of at least part of the data that was collected; and send the other communications via the networking circuitry.

12. The device of claim 11, wherein the processing circuity is adapted to generate at least part of the other communications by enriching at least part of the communications that are intercepted, each of the at least part of the other communications indicative of both some of the data that was collected and of some of the data determined by and relating to any of the one or more other devices.

13. The device of claim 11, wherein the processing circuitry is further adapted to store collected data in at least one memory.

14. The device of claim 13, wherein at least part of the at least one memory is in the cloud.

15. The device of claim 11, wherein the networking circuitry is adapted to receive data that the processing circuitry is adapted to collect, via direct interfaces to one or more source devices which are adapted to determine the data that the processing circuitry is adapted to collect.

16. The device of claim 11, wherein the device is included in a packet core of a mobile 3GPP network, and wherein the data entering the device is from one or more source devices included in at least one of the packet core or a radio access network of the mobile 3GPP network.

17. The device of claim 11, wherein the device is in a network, the network further including:

the one or more destination devices, each adapted to administer a plurality of second devices, the one or more other devices including the plurality of second devices; and the one or more other devices, wherein the one or more other devices include one or more Internet of Things (IoT) devices.

18. The device of claim 11, wherein at least one of: at least part of the communications or at least part of the other communications are in accordance with a OneM2M standard.

19. A computer program product, comprising a non-transitory computer readable medium having computer readable program code embodied therein, the computer program product comprising computer readable program code for causing a first computer to:

intercept a first communication that is destined for a second computer or that is originating from the second computer but is not destined for the first computer, the first communication requesting data relating to a third computer or indicative of data determined by and relating to the third computer;

generate one or more resources relating to the third computer;

collecting state data for the one or more resources, the state data having been determined by one or more devices, the one or more devices including the at least one of the first computer or one or more fourth devices;

subsequent to said intercepting, generate a second communication destined for the second computer, wherein the second communication is indicative of data relating to the third computer that was determined by at least one of the first computer or one or more fourth computers, wherein the second communication is indicative of state data that was determined by the at least one of the first computer or the one or more fourth devices and that was collected; and send the second communication.

20. The computer program product of claim 19, further comprising computer readable program code for causing a first computer to:

collect the data relating to the third computer that was determined by the at least one of the first computer or the one or more fourth devices;

collect additional data, the additional data including at least one of:

data relating to the third device that was determined by the at least one of the first computer or the one or more fourth devices at various times, or data relating to other devices; and analyze the data and the additional data that was collected; and based on a result of said analyzing, predict future data relating to the third computer.

* * * * *